(12) United States Patent
Balasundaram et al.

(10) Patent No.: US 10,061,984 B2
(45) Date of Patent: Aug. 28, 2018

(54) PROCESSING AN IMAGE TO IDENTIFY A METRIC ASSOCIATED WITH THE IMAGE AND/OR TO DETERMINE A VALUE FOR THE METRIC

(71) Applicant: Accenture Global Solutions Limited, Dublin (IE)

(72) Inventors: Uvaraj Balasundaram, Singapore (SG); Kamal Mannar, Singapore (SG); Andrew K. Musselman, Seattle, WA (US); Devanandan Subbarayalu, Singapore (SG)

(73) Assignee: Accenture Global Solutions Limited, Dublin (IE)

( * ) Notice: Subject to any disclaimer, the term of this patent is extended or adjusted under 35 U.S.C. 154(b) by 5 days.

(21) Appl. No.: 15/332,534

(22) Filed: Oct. 24, 2016

(65) Prior Publication Data

US 2018/0114068 A1    Apr. 26, 2018

(51) Int. Cl.
*G06K 9/00*    (2006.01)
*G06T 7/00*    (2017.01)
*G07F 17/32*    (2006.01)

(52) U.S. Cl.
CPC ..... *G06K 9/00718* (2013.01); *G06K 9/00744* (2013.01); *G06T 7/0004* (2013.01);
(Continued)

(58) Field of Classification Search
CPC ............ G06K 9/00718; G06K 9/00744; G06T 7/0004; G06T 2207/30108;
(Continued)

(56) References Cited

U.S. PATENT DOCUMENTS

| 7,699,694 B2 | 4/2010 | Hill | |
| 8,238,671 B1 * | 8/2012 | Babenko | G06K 9/00671 |
| | | | 382/224 |

(Continued)

FOREIGN PATENT DOCUMENTS

| AU | 2016210614 | 2/2017 |
| CN | 105528417 | 4/2016 |

OTHER PUBLICATIONS

Moore et al. "Exploiting human actions and object context for recognition tasks." Computer Vision, 1999. The Proceedings of the Seventh IEEE International Conference on. vol. 1. IEEE, 1999.*

(Continued)

*Primary Examiner* — Katrina Fujita
(74) *Attorney, Agent, or Firm* — Harrity & Harrity, LLP

(57) ABSTRACT

A device may receive one or more images captured by an image capture system. The one or more images may depict one or more objects. The device may process the one or more images using one or more image processing techniques. The device may identify the one or more objects based on processing the one or more images. The device may identify a context of the one or more images based on the one or more objects depicted in the one or more images. The device may determine whether the one or more objects contribute to a value of one or more metrics associated with the context. The device may perform an action based on the value of the one or more metrics.

20 Claims, 25 Drawing Sheets
(10 of 25 Drawing Sheet(s) Filed in Color)

(52) U.S. Cl.
CPC ............... *G06T 2207/30108* (2013.01); *G06T 2207/30204* (2013.01); *G07F 17/3232* (2013.01); *G07F 17/3241* (2013.01)

(58) Field of Classification Search
CPC ....... G06T 2207/30204; G07F 17/3232; G07F 17/3241
See application file for complete search history.

(56) References Cited

U.S. PATENT DOCUMENTS

| | | | | |
|---|---|---|---|---|
| 8,611,592 | B2* | 12/2013 | Wallace | G06K 9/00704 382/103 |
| 8,744,125 | B2* | 6/2014 | Zhu | G06K 9/68 382/103 |
| 8,947,547 | B1* | 2/2015 | Millikan | H04N 1/00156 348/211.1 |
| 9,171,352 | B1* | 10/2015 | Raynaud | G06T 5/00 |
| 9,305,216 | B1* | 4/2016 | Mishra | G06K 9/00771 |
| 9,319,640 | B2* | 4/2016 | Ptucha | H04N 7/183 |
| 9,497,202 | B1* | 11/2016 | Calo | H04L 63/105 |
| 9,609,182 | B1* | 3/2017 | Millikan | H04N 5/225 |
| 9,648,129 | B2* | 5/2017 | Chedeau | H04L 67/306 |
| 9,652,694 | B2* | 5/2017 | Jiang | G06K 9/6284 |
| 9,852,344 | B2* | 12/2017 | Dunlop | G06K 9/00718 |
| 2005/0051965 | A1* | 3/2005 | Gururajan | A63F 1/14 273/292 |
| 2007/0077987 | A1* | 4/2007 | Gururajan | G07F 17/32 463/22 |
| 2008/0170749 | A1 | 7/2008 | Albertson et al. | |
| 2008/0198159 | A1 | 8/2008 | Liu et al. | |
| 2008/0267536 | A1* | 10/2008 | Moroney | G06T 5/00 382/311 |
| 2010/0238351 | A1* | 9/2010 | Shamur | G11B 27/036 348/598 |
| 2010/0260438 | A1* | 10/2010 | Morikawa | G06K 9/00624 382/284 |
| 2011/0087677 | A1 | 4/2011 | Yoshio et al. | |
| 2011/0200230 | A1* | 8/2011 | Luke | G06K 9/00791 382/103 |
| 2015/0066448 | A1 | 5/2015 | Liu et al. | |
| 2015/0186726 | A1* | 7/2015 | Jiang | G06K 9/00624 382/195 |
| 2015/0199872 | A1* | 7/2015 | George | G07F 17/3237 463/31 |
| 2015/0294193 | A1* | 10/2015 | Tate | G06K 9/00785 382/159 |

OTHER PUBLICATIONS

Yong et al. "Novelty detection in wildlife scenes through semantic context modelling." Pattern Recognition 45.9 (2012): 3439-3450.*
Li et al. "What, where and who? classifying events by scene and object recognition." Computer Vision, 2007. ICCV 2007. IEEE 11th International Conference on. IEEE, 2007. APA.*
Oliva et al. "The role of context in object recognition." Trends in cognitive sciences 11.12 (2007): 520-527.*
Divvala et al. "An empirical study of context in object detection." Computer Vision and Pattern Recognition, 2009. CVPR 2009. IEEE Conference on. IEEE, 2009.*
Bose et al. "Learning to use scene context for object classification in surveillance." Proc. Joint IEEE Int'l Workshop on VS-PETS, Nice, France, p. 94-101. 2003.*
Wikipedia, "Deep learning," https://en.wikipedia.org/wiki/Deep_learning#Image_recognition, Oct. 19, 2016, 36 pages.
Wikipedia, "Feature extraction," https://en.wikipedia.org/wiki/Feature_extraction, Aug. 2, 2016, 3 pages.
Wikipedia, "Convolutional neural network," https://en.wikipedia.org/wiki/Convolutional_neural_network, Oct. 19, 2016, 16 pages.
Wikipedia, "Video content analysis," https://en.wikipedia.org/wiki/Video_content_analysis, Sep. 29, 2016, 4 pages.
Wikipedia, "HSL and HSV," https://en.wikipedia.org/wiki/HSL_and_HSV, Oct. 15, 2016, 18 pages.
Wikipedia, "Feature detection (computer vision)," https://en.wikipedia.org/wiki/Feature_detection_(computer_vision), Sep. 16, 2016, 4 pages.
Wikipedia, "Adaptive histogram equalization," https://en.wikipedia.org/wiki/Adaptive_histogram_equalization, Oct. 4, 2016, 4 pages.
Wikipedia, "Noise reduction," https://en.wikipedia.org/wiki/Noise_reduction#Types, Oct. 16, 2016, 7 pages.
Wikipedia, "Anisotropic diffusion," https://en.wikipedia.org/wiki/Anisotropic_diffusion, Oct. 21, 2016, 4 pages.
Wikipedia, "Otsu's method," https://en.wikipedia.org/wiki/Otsu%27s_method, Oct. 13, 2016, 9 pages.
Wikipedia, "Thresholding (image processing)," https://en.wikipedia.org/wiki/Thresholding_(image_processing), Aug. 18, 2016, 2 pages.
Wikipedia, "Mathematical morphology," https://en.wikipedia.org/wiki/Mathematical_morphology#Dilation, Aug. 17, 2016, 9 pages.
Wikipedia, "Digital image processing," https://en.wikipedia.org/wiki/Digital_image_processing, Sep. 18, 2016, 3 pages.
Lehar, "An Intuitive Explanation of Fourier Theory," http://cns-alumni.bu.edu/~slehar/fourier/fourier.html, Apr. 1, 2002, 8 pages.
OpenCV, "Back Projection," http://www.swarthmore.edu/NatSci/mzucker1/opencv-2.4.10-docs/doc/tutorials/imgproc/histograms/back_projection/back_projection.html, Feb. 14, 2015, 6 pages.
Wikipedia, "Computer vision," https://en.wikipedia.org/wiki/Computer_vision, Sep. 16, 2016, 11 pages.
Wikipedia, "Canny edge detector," https://en.wikipedia.org/wiki/Canny_edge_detector, Sep. 2, 2016, 8 pages.
Wikipedia, "Histogram equalization," https://en.wikipedia.org/wiki/Histogram_equalization, Oct. 19, 2016, 9 pages.
Wikipedia, "Image segmentation," https://en.wikipedia.org/wiki/Image_segmentation, Sep. 1, 2016, 17 pages.
Wikipedia, "Template matching," https://en.wikipedia.org/wiki/Template_matching, Sep. 24, 2016, 5 pages.
Wikipedia, "Watershed (image processing)," https://en.wikipedia.org/wiki/Watershed_(image_processing), Mar. 25, 2016, 5 pages.
Wikipedia, "Convex hull," https://en.wikipedia.org/wiki/Convex_hull, Sep. 21, 2016, 5 pages.
"Frontiers in Image and Video Analysis, NSF/FBI/DARPA Workshop Report", Workshop on Frontiers in Image and Video Analysis, Jan. 28-29, 2014 [Retrieved on Feb. 15, 2018]. Retrieved from the internet. <URL: http://www.umiacs.umd.edu/~rama/NSF_report.pdf>.

* cited by examiner

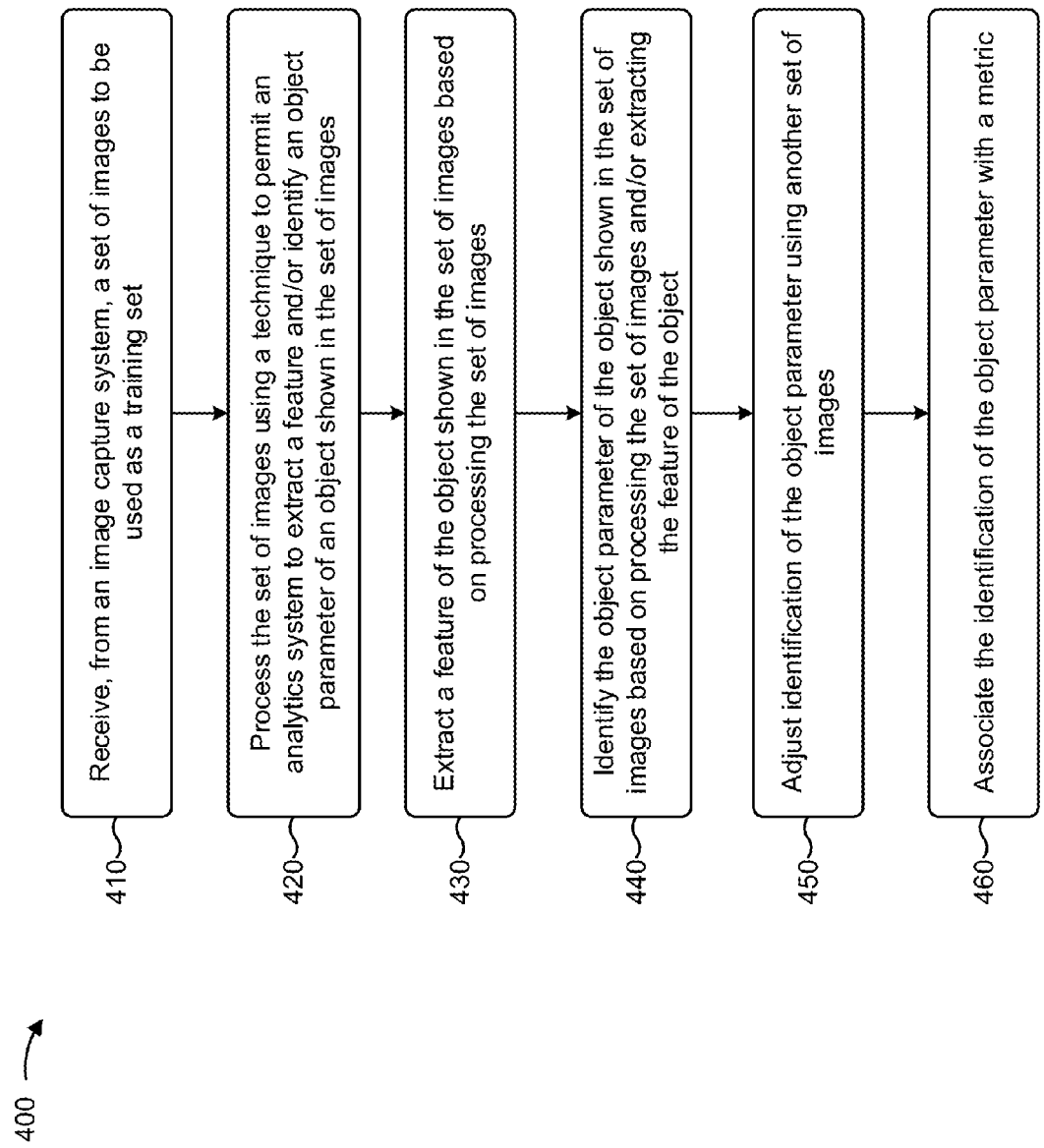

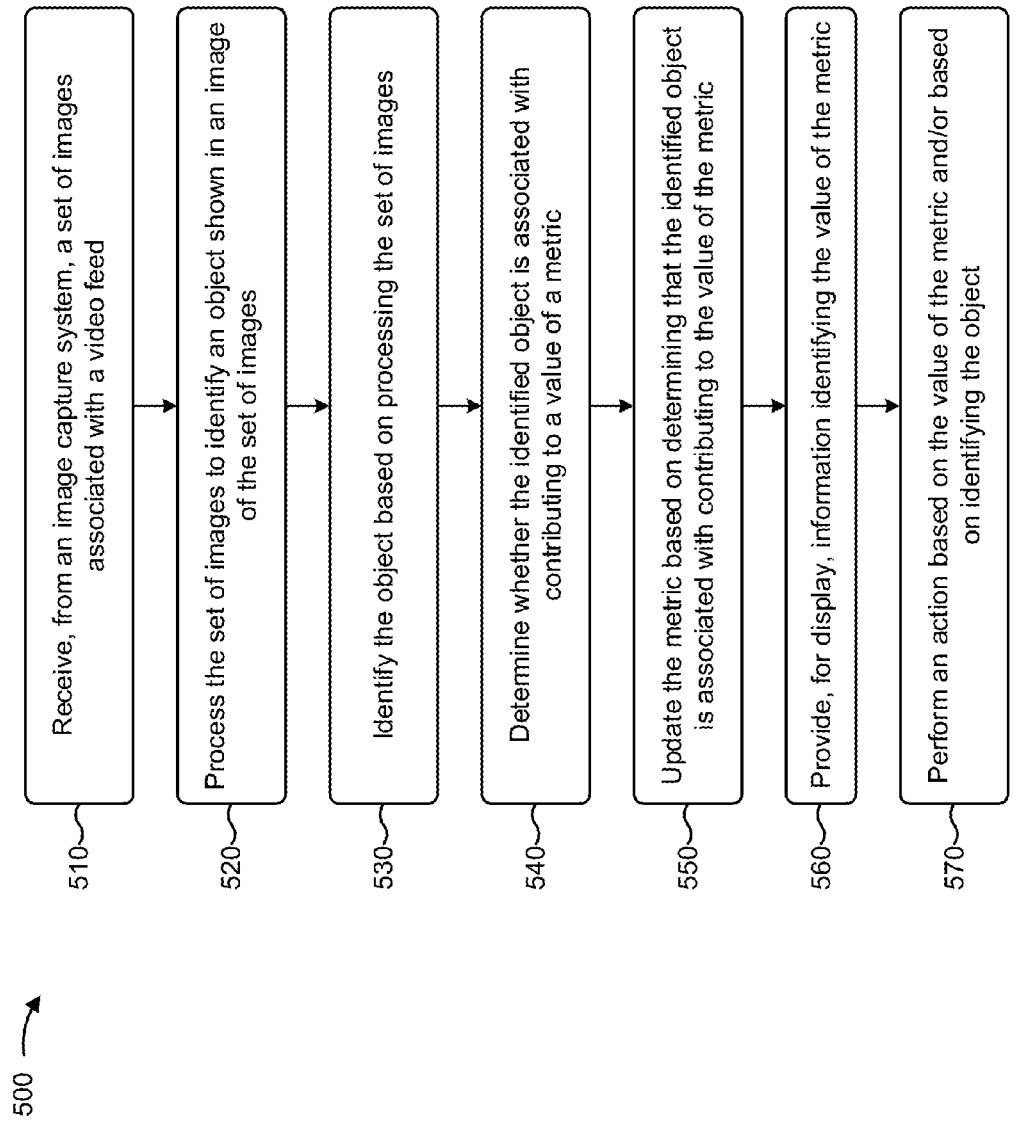

PROCESSING AN IMAGE TO IDENTIFY A METRIC ASSOCIATED WITH THE IMAGE AND/OR TO DETERMINE A VALUE FOR THE METRIC

BACKGROUND

Video content analysis is the capability of automatically analyzing video content to detect and determine temporal and spatial events. This technical capability is used in a wide range of domains including manufacturing, security, entertainment, healthcare, retail, automotive, transport, or the like.

SUMMARY

According to some possible implementations, a device may include one or more processors to receive a set of images to be processed. An image, of the set of images, may depict multiple objects. A first object of the multiple objects may be different than a second object of the multiple objects. The one or more processors may process the image. The one or more processors may identify a context of the image based on processing the image. The one or more processors may identify the first object or the second object based on the context of the image. The one or more processors may identify a metric associated with the first object or the second object. The one or more processors may determine that the first object or the second object contributes to a value of the metric. The one or more processors may update the value of the metric based on determining that the first object or the second object contributes to the value of the metric. The one or more processors may perform an action based on the value of the metric or based on identifying the first object or the second object.

According to some possible implementations, a computer-readable medium may store one or more instructions that, when executed by one or more processors, cause the one or more processors to receive, from an image capture system, one or more images captured by the image capture system. The one or more images may depict one or more objects. The one or more instructions may cause the one or more processors to process the one or more images using one or more image processing techniques. The one or more instructions may cause the one or more processors to identify the one or more objects based on processing the one or more images. The one or more instructions may cause the one or more processors to identify a context of the one or more images based on the one or more objects depicted in the one or more images. The one or more instructions may cause the one or more processors to determine whether the one or more objects contribute to a value of one or more metrics associated with the context. The one or more instructions may cause the one or more processors to perform an action based on the value of the one or more metrics.

According to some possible implementations, a method may include receiving, by a device, a set of images to be used as a training set. The set of images may depict multiple objects. The method may include processing, by the device, the set of images using a set of techniques based on receiving the set of images. The processing may permit the device to extract a feature or identify an object parameter of an object depicted in the set of images. The method may include extracting, by the device, the feature of the object depicted in the set of images based on processing the set of images. The method may include identifying, by the device, the object parameter of the object depicted in the set of images based on processing the set of images or extracting the feature of the object. The method may include identifying, by the device, a context of the set of images based on the extracted feature or the object parameter. The method may include storing, by the device, the set of images, information identifying the extracted feature, or information identifying the identified object parameter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 is a flow chart of an example process for processing an image to identify an object parameter of an object shown in the image and to associate the object parameter with a metric;

FIG. 5 is a flow chart of an example process for processing an image to identify a metric associated with the image and/or to determine a value for the metric;

DETAILED DESCRIPTION

The following detailed description of example implementations refers to the accompanying drawings. The same reference numbers in different drawings may identify the same or similar elements.

An individual may wish to install a camera at a location to capture images and/or video of the location. In some cases, the individual may wish to analyze the images and/or video to track metrics associated with an object shown in the images and/or video, and may wish to analyze the images and/or the video in real-time or near real-time. Accurate and efficient analysis of the images and/or the video may require accurate and efficient feature extraction and/or object detection.

In some implementations described herein, an analytics system may automatically receive and analyze images and/or video from a real-time or near real-time video feed. The analytics system may automatically identify an object shown in the images and/or the video and may automatically track metrics associated with the object. In addition, the analytics system may automatically perform an action based on identifying the object and/or based on a value of the metrics.

In this way, implementations described herein improve an accuracy and an efficiency of analyzing images and/or video to track metrics by using processing techniques to accurately and efficiently extract features and/or detect objects in images and/or video. Implementations described herein also improve efficiency by reducing an amount of time needed to analyze the images and/or video to track the metrics. Implementations described herein further improve an efficiency of analyzing the images and/or the video, by enabling dynamic analysis of images and/or video and tracking of metrics in real-time or near real-time based on a context of the images and/or the video.

Figure 1A:
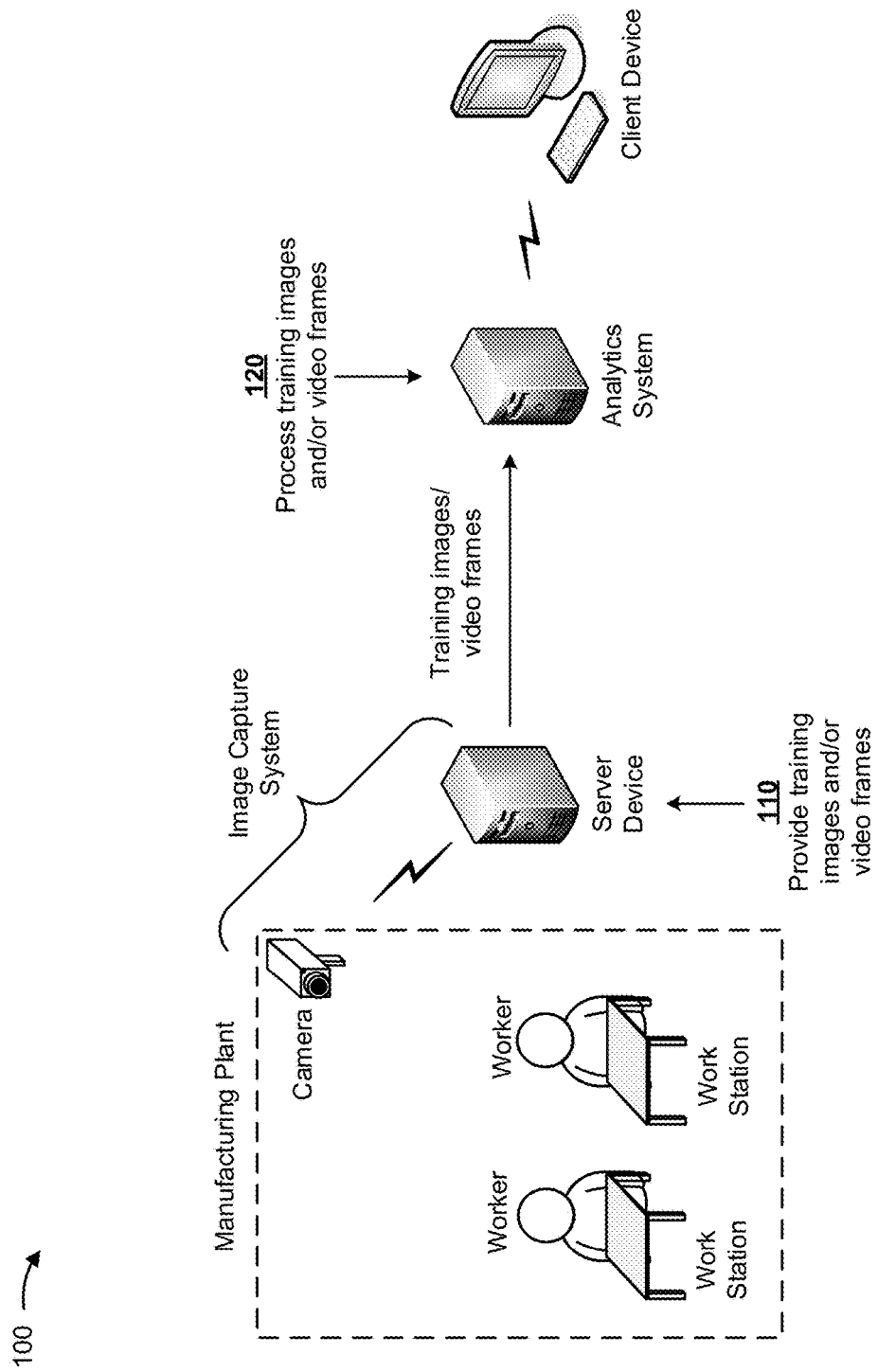
FIGS. 1A-1C are diagrams of an overview of an example implementation described herein.
Figure 1B:
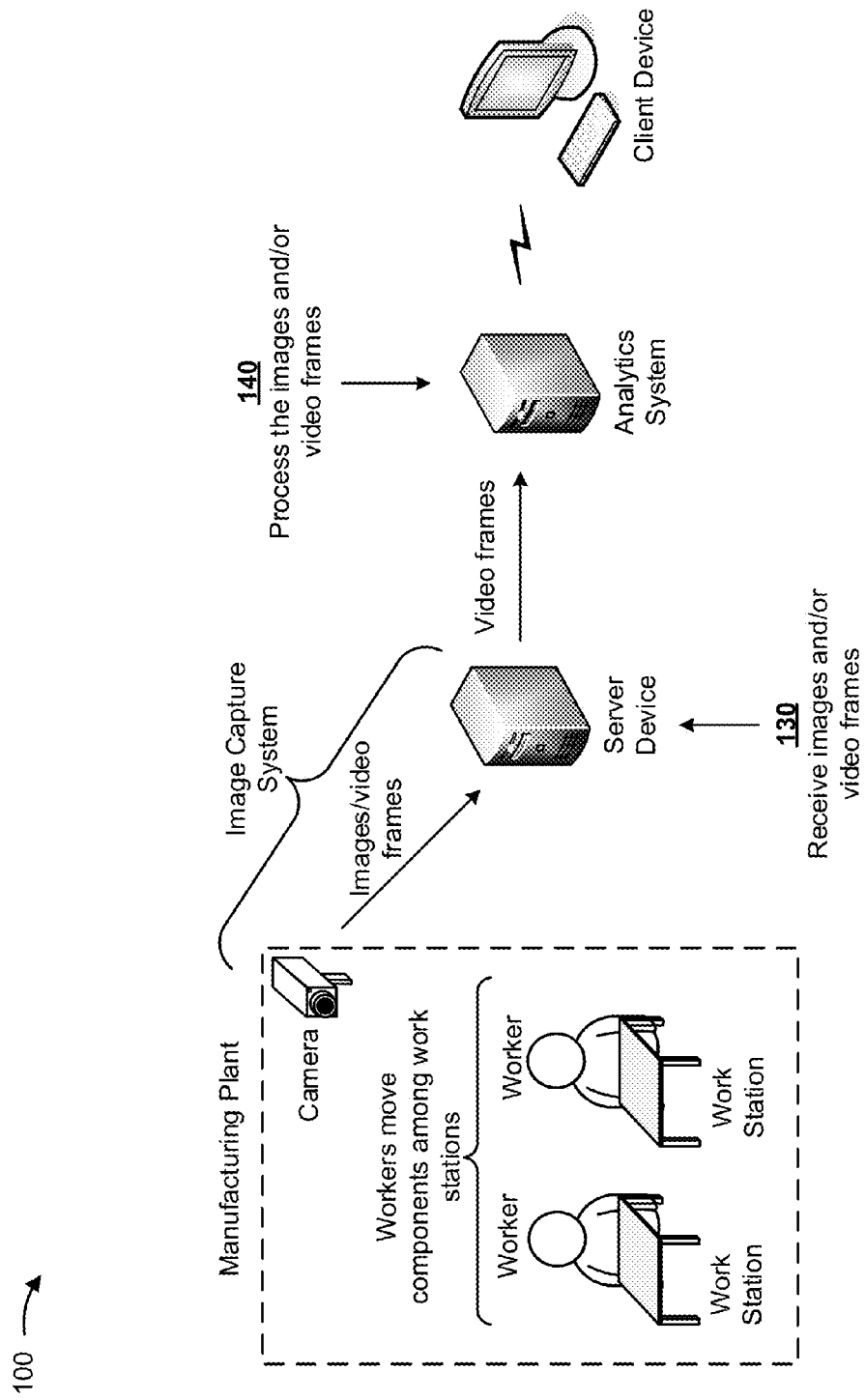
Figure 1C:
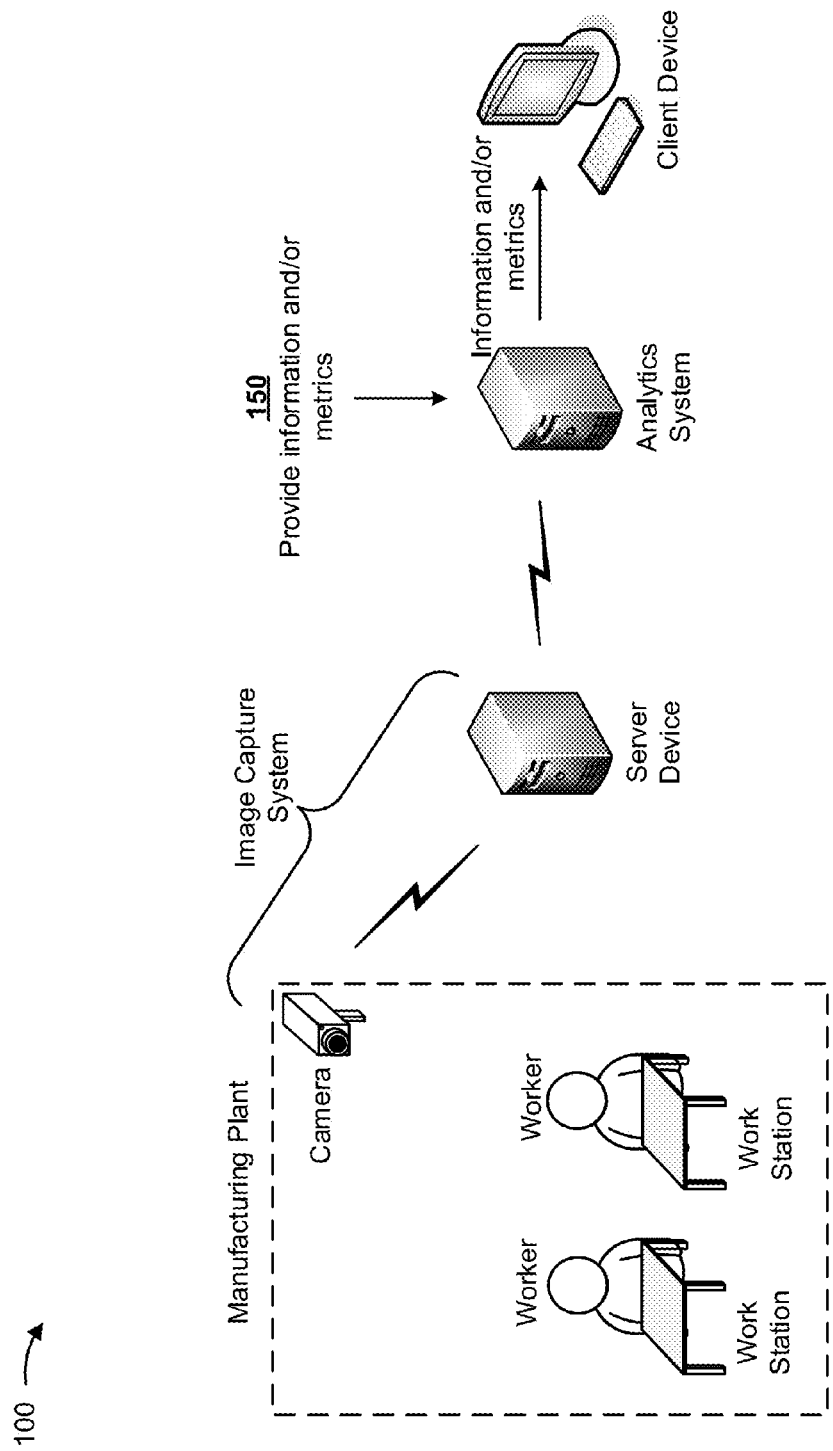

FIGS. 1A-1C are diagrams of an overview of an example implementation 100 described herein. Example implementation 100 includes a manufacturing context with workers and work stations, an image capture system, an analytics system, and a client device. The image capture system includes a camera and a server device. Workers may be people or machines, such as robots capable of performing one or more actions that can be captured by an image capture system.

In example implementation 100, workers in a manufacturing plant move about and move components between work stations. Assume, for example, that the image capture system has captured training images and/or video frames of the movement of the workers and/or the components between the work stations (e.g., using a camera to capture the training images and/or video frames).

As shown in FIG. 1A, and by reference number 110, the server device may provide training images and/or video frames to the analytics system. For example, the server device may provide previously captured training images and/or video frames, such as historical images and/or video frames stored by the server device, to the analytics system. As shown by reference number 120, the analytics system may process the training images and/or video frames and may extract features and/or parameters of worker movements and/or component movements shown by the training images and/or video frames. For example, the analytics system may process the training images and/or video frames using an image processing technique and/or a video frame processing technique.

As shown in FIG. 1B, and by reference number 130, the server device may receive images and/or video frames from the camera (e.g., real-time or near real-time images and/or video frames, rather than historical images and/or video frames that were previously captured) and may provide the images and/or video frames to the analytics system. As shown by reference number 140, the analytics system may process the images and/or video frames to, for example, identify and/or track worker movements and/or component movements that are shown by the images and/or video frames. For example, the analytics system may use an image processing technique and/or a video frame processing technique to identify and/or track the worker movements.

As shown in FIG. 1C, and by reference number 150, the analytics system may provide information and/or metrics associated with the workers and/or the components, to be displayed by the client device. For example, the analytics system may provide information about an amount of time that components are located at a particular workstation, a quantity of times workers move between work stations, a quantity of components that are malformed, a quantity of components assembled by a particular worker, etc. In addition, the analytics system may automatically perform another action based on identifying and/or tracking the workers and/or the components. For example, the analytics system may provide a message and/or a command to another device to cause the other device to remove a malformed component from production, to schedule a meeting among forepersons of the manufacturing plant regarding worker productivity or efficiency of a layout of the manufacturing plant, or the like.

In this way, an analytics system may automatically receive an image and/or a video frame, process the image and/or video frame to identify and track a metric associated with an object shown in the image and/or the video frame, and perform an action based on identifying and tracking the metric. Having the analytics system automatically receive and analyze an image and/or video frame from an image capture system, identify an object shown in the image and/or video frame, and provide for display metrics associated with the object may improve an accuracy or an efficiency of analyzing the image and/or video frame to track metrics by using a processing technique to accurately and efficiently extract a feature and/or detect an object in an image and/or video. Additionally, efficiency may be improved by reducing an amount of time needed to analyze the image and/or video frame to track the metrics, thereby conserving processing resources of the analytics system.

As indicated above, FIGS. 1A-1C are provided merely as an example. Other examples are possible and may differ from what was described with regard to FIGS. 1A-1C. For example, the implementations described above may be applicable to a context other than a manufacturing context, such as a public safety context, a travel context, a casino context, etc.

Figure 2:
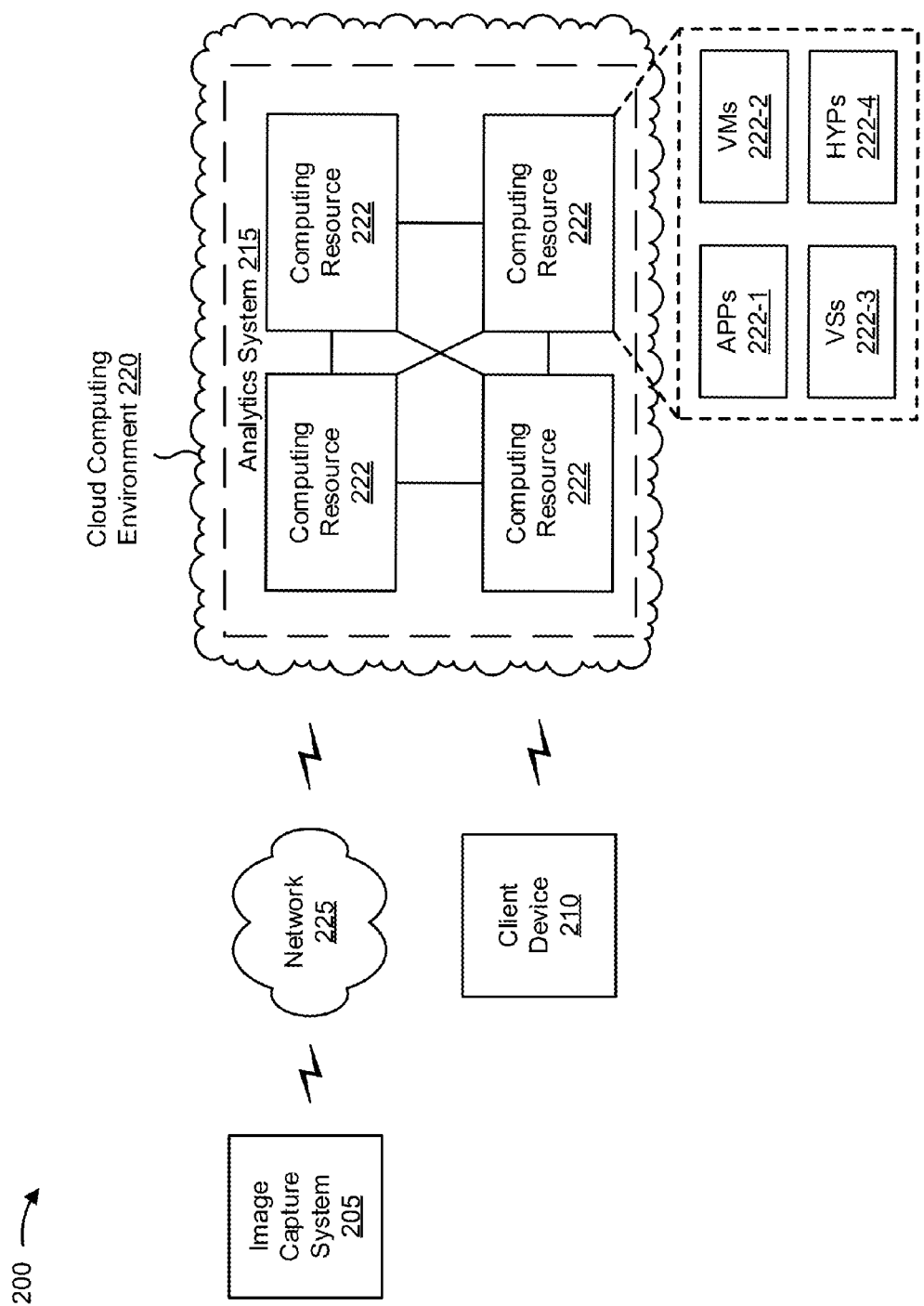
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an image capture system 205, a client device 210, an analytics system 215 hosted within a cloud computing environment 220, and a network 225. Devices of environment 200 may interconnect via wired connections, wireless connections, or a combination of wired and wireless connections.

Image capture system 205 includes one or more devices capable of recording, receiving, storing, processing, and/or providing an image. For example, image capture system 205 may include one or more cameras, one or more server devices (e.g., in a data center or in a cloud computing environment), a communication and/or computing device, such as a desktop computer, a laptop computer, a smartphone, or a similar type of device. In some implementations, image capture system 205 may capture an image or a series of images (e.g., a video) of a location and may store the image, as described elsewhere herein. Additionally, or alternatively, image capture system 205 may provide the captured image (e.g., a historical image or a real-time/near real-time image) to analytics system 215, as described elsewhere herein.

Client device 210 includes one or more devices capable of receiving, generating, storing, processing, and/or providing information associated with an image captured by image capture system 205. For example, client device 210 may include a communication and/or computing device, such as a desktop computer, a laptop computer, a tablet computer, a server device (e.g., in a data center or in a cloud computing environment), a mobile phone (e.g., a smart phone or a radiotelephone), a gaming device, a wearable communication device (e.g., a smart wristwatch, a pair of smart eyeglasses, or a smart activity band), or a similar type of device. In some implementations, client device 210 may receive, from analytics system 215, information associated with processing an image, as described elsewhere herein. Additionally, or alternatively, client device 210 may provide the information for display (e.g., via a display of client device 210), as described elsewhere herein.

Analytics system 215 includes one or more devices capable of obtaining an image to be processed, processing the image, and/or providing, for display, information associated with processing the image, as described elsewhere herein. For example, analytics system 215 may include a cloud server or a group of cloud servers. In some implementations, analytics system 215 may be designed to be modular such that certain software components can be swapped in or out depending on a particular need. As such, analytics system 215 may be easily and/or quickly reconfigured for different uses.

In some implementations, as shown, analytics system 215 may be hosted in cloud computing environment 220. Notably, while implementations described herein describe analytics system 215 as being hosted in cloud computing environment 220, in some implementations, analytics system 215 may not be cloud-based (i.e., may be implemented outside of a cloud computing environment) or may be partially cloud-based.

Cloud computing environment 220 includes an environment that hosts analytics system 215. Cloud computing environment 220 may provide computation, software, data access, storage, etc. services that do not require end-user knowledge of a physical location and configuration of system(s) and/or device(s) that hosts analytics system 215. As shown, cloud computing environment 220 may include a group of computing resources 222 (referred to collectively as "computing resources 222" and individually as "computing resource 222").

Computing resource 222 includes one or more personal computers, workstation computers, server devices, or another type of computation and/or communication device. In some implementations, computing resource 222 may host analytics system 215. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

As further shown by FIG. 2, computing resource 222 includes a group of cloud resources, such as one or more applications ("APPs") 222-1, one or more virtual machines ("VMs") 222-2, one or more virtualized storages ("VSs") 222-3, or one or more hypervisors ("HYPs") 222-4.

Application 222-1 includes one or more software applications that may be provided to or accessed by client device 210. Application 222-1 may eliminate a need to install and execute the software applications on client device 210. For example, application 222-1 may include software associated with analytics system 215 and/or any other software capable of being provided via cloud computing environment 220. In some implementations, one application 222-1 may send/receive information to/from one or more other applications 222-1, via virtual machine 222-2.

Virtual machine 222-2 includes a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of a user (e.g., client device 210), and may manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 may provide hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

Network 225 includes one or more wired and/or wireless networks. For example, network 225 may include a cellular network (e.g., a long-term evolution (LTE) network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown by FIG. 2 are provided as an example. In practice, there may be additional devices and/or networks, fewer devices and/or networks, different devices and/or networks, or differently arranged devices and/or networks than those shown by FIG. 2. Furthermore, two or more devices shown by FIG. 2 may be implemented within a single device, or a single device shown by FIG. 2 may be implemented as multiple, distributed devices. Additionally, or alternatively, a set of devices (e.g., one or more devices) of environment 200 may perform one or more functions described as being performed by another set of devices of environment 200.

Figure 3:
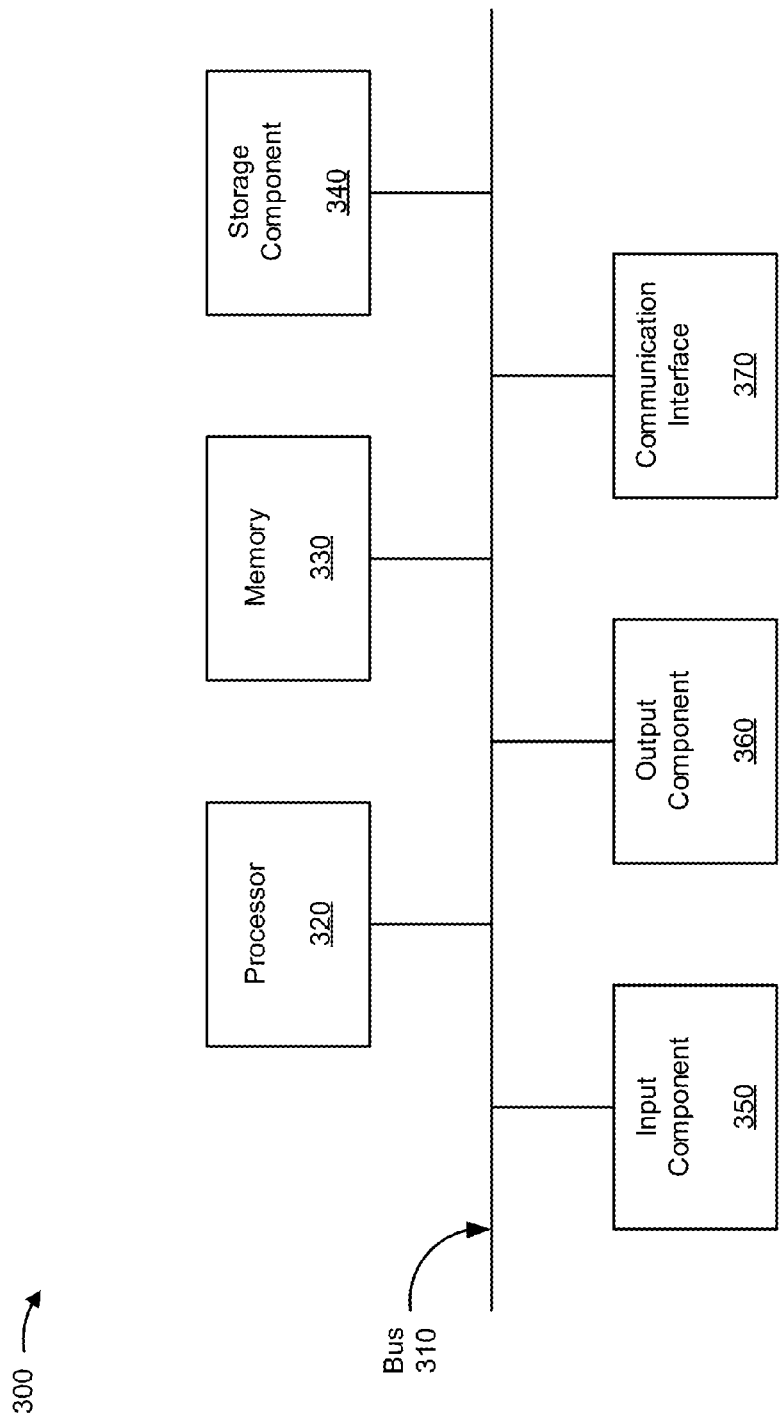
FIG. 3 is a diagram of example components of one or more devices of FIG. 2.

FIG. 3 is a diagram of example components of a device 300. Device 300 may correspond to image capture system 205, client device 210, analytics system 215, and/or computing resource 222. In some implementations, image capture system 205, client device 210, analytics system 215, and/or computing resource 222 may include one or more devices 300 and/or one or more components of device 300. As shown by FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for processing an image to identify an object parameter of an object shown in the image and to associate the object parameter with a metric. In some implementations, one or more process blocks of FIG. 4 may be performed by analytics system 215. In some implementations, one or more process blocks of FIG. 4 may be performed by another device or a group of devices separate from or including analytics system 215, such as image capture system 205 and/or client device 210.

As shown by FIG. 4, process 400 may include receiving, from an image capture system, a set of images to be used as a training set (block 410). For example, analytics system 215 may receive a set of images to be used as a training set. In some implementations, the set of images to be used as the training set may include historical and/or archived images captured by image capture system 205 (e.g., a set of pre-recorded images and/or a set of images captured in non-real-time or non-near real-time). Additionally, or alternatively, the training set of images may include a set of real-time, near real-time, and/or user-loaded images. Real-time may refer to images captured at a rate sufficient such that a person cannot perceive a delay between a scene or sequence of scenes occurring in the real-world and movement captured in images displayed contemporaneously with and showing the real-world scene(s). Near real-time may refer to images captured at a rate that causes a person viewing the images to perceive a delay between a real-world scene or sequence of scenes and images of the scene(s). For example, an image capture device that captures an image every 3 seconds may be considered to be operating near real-time whereas a video camera may be considered to be operating in real-time.

In some implementations, the training set may include a set of data that is used in machine learning, pattern recognition, or the like, to identify predictive relationships. In some implementations, machine learning may include providing computers with the ability to learn and predict relationships without being explicitly programmed to do so. For example, machine learning algorithms may operate by building a model from an example training set of input data, such as the set of images received by analytics system 215, in order to make data-driven predictions or perform actions based on the data. In some implementations, pattern recognition algorithms may operate by recognizing patterns and/or regularities in the data.

In some implementations, the training set for the model may include the set of images received by analytics system 215. For example, analytics system 215 may receive one or more historical images from image capture system 205 to be used as the training set. In some implementations, the set of images may include a digital image, a video frame, a portion of a digital image, a portion of a video frame, or the like. For example, the set of images may include images as captured by image capture system 205 (e.g., unprocessed images). As another example, the set of images may include portions of the images captured by image capture system 205 (e.g., cropped, or otherwise processed, portions of images captured by image capture system 205). In some implementations, a video frame and/or a portion of the video frame may include still images associated with the video frame.

In some implementations, the set of images may include images of an object and/or an area of interest to be identified in an image as well as images associated with identifying a context of the images. For example, in an airport context, the set of images may include images of travelers and luggage where the combination of the travelers and luggage is to be identified. As another example, to identify the context as an airport context, the set of images may include images of airline logos, baggage carts, luggage, or the like.

As another example, in a manufacturing context, the set of images may include images of workstations, workers, and/or manufacturing components that are to be identified. As another example, to identify the context as a manufacturing context, the set of images may include images of conveyor belts, manufacturing equipment, workstations, hardhats, or the like.

As another example, in a gaming context, the set of images may include images of a gaming table, betting slots, betting slots with chips, playing cards, or the like, that are to be identified. As another example, to identify the context as a gaming context, the set of images may include images of playing cards, playing chips, betting slots, gaming tables, or the like. Alternatively, or additionally, to identify the context as a gaming context, the set of images may include images of different gaming table layouts and/or gaming table configurations, such as images of a gaming table with a Texas hold'em layout, a Black Jack configuration, or the like.

In some implementations, analytics system 215 may receive the images based on requesting the images from image capture system 205 and/or a server device associated with image capture system 205. Alternatively, or additionally, analytics system 215 may receive the images periodically from image capture system 205. Receiving the images periodically may be based on a schedule, for example.

As further shown by FIG. 4, process 400 may include processing the set of images using a technique to permit an analytics system to extract a feature and/or identify an object parameter of an object shown in the set of images (block 420). For example, analytics system 215 may process the set of images using a technique to permit analytics system 215 to extract a feature and/or identify an object parameter of an object shown in an image. In some implementations, analytics system 215 may process the set of images in association with receiving the set of images from image capture system 205.

In some implementations, a feature may include an individual measurable property of an object depicted in an image. For example, a feature of an object shown in an image may include an edge of the object, a corner of the object, a blob of the object, a region of interest of the object, a ridge of the object, or the like. In some implementations, an object parameter may include a shape of an object, an outline of an object, or the like.

In some implementations, analytics system 215 may process an image (e.g., of the set of images) using a color-space transformation technique, to transform the image from one color space (e.g., a red, green, blue (RGB) color space) to another color space. In some implementations, a color space may include a specific organization of colors that allows for reproducible representations of color in analog and/or digital representations.

In some implementations, when processing an image, such as when using a color-space transformation technique, analytics system 215 may use an algorithm to process color components of the image to adjust hue, saturation, and value (HSV) color space. In some implementations, HSV may include a color model that describes colors (hue or tint) in terms of their shade (saturation or amount of gray) and their brightness (value or luminance). Alternatively, or additionally, when processing an image, such as when using a color-space transformation technique, analytics system 215 may use an algorithm to transform the color components of an image to grayscale (e.g., to transform a color image to a grayscale image). For example, analytics system 215 may transform color pixels of an image to pixels that include intensity information without including color information. Processing the color components and/or transforming the color components, such as by using a color-space transformation technique, may improve feature extraction and/or object identification shown in the image by enabling separation of color components of the objects in the image.

In some implementations, analytics system 215 may process an image using a histogram equalization technique. For example, histogram equalization may include a method of contrast adjustment using a histogram of an image. In some implementations, analytics system 215 may process an image using a local adaptive histogram equalization technique to adjust a contrast of the image. For example, analytics system 215 may process the image by computing multiple histograms for portions of the image and using the histograms to redistribute lightness values of the image. By using a histogram equalization technique to process an image, analytics system 215 may improve feature extraction and/or identification of object parameters by modifying the contrast of the image, for example to increase contrast among features and/or parameters of objects shown in the image.

In some implementations, analytics system 215 may process an image using a de-noising technique to remove noise from the image. For example, analytics system 215 may use an algorithm to adjust a color and/or an intensity of a particular pixel in an image to de-noise the image. By using a de-noising technique to process an image, analytics system 215 may improve feature extraction and/or object identification by improving a quality of the image to enable analytics system 215 to quickly and efficiently extract features and/or identify objects shown in the image.

In some implementations, analytics system 215 may process an image using a smoothing and/or filtering technique. For example, analytics system 215 may use a Gaussian smoothing technique by filtering pixels of the image using a low-pass Gaussian filter. In some implementations, when using the low-pass Gaussian filter, analytics system 215 may adjust an intensity of a particular pixel based on an intensity of other pixels proximate to the particular pixel. Alternatively, or additionally, analytics system 215 may use an anisotropic smoothing technique to de-noise an image by processing the image according to a differential equation. By using a smoothing and/or filtering technique, analytics system 215 may preserve edges and/or lines of objects shown in an image, thereby improving the image without impeding edge and/or line detection, which may improve feature extraction and/or object identification.

In some implementations, analytics system 215 may process an image using an Otsu method. For example, analytics system 215 may use a local Otsu thresholding technique to process the image to generate a binary image by replacing pixels of the image with black pixels or white pixels depending on whether the intensity of the pixels satisfies a threshold. By using an Otsu method to process the image, analytics system 215 may improve feature extraction and/or object identification by reducing a complexity of colors in the image. In addition, this conserves processing resources of analytics system 215 when analyzing the image by providing analytics system 215 with a simplified image to analyze (e.g., an image with only black and white colors).

In some implementations, analytics system 215 may process an image by applying a morphology technique to the image. For example, analytics system 215 may perform a morphological operation, such as erosion, dilation, opening, and/or closing, by retaining or deleting pixels of the image depending on whether a structuring element matches or does not match shapes in the image. By using the morphology technique to process the image, analytics system 215 may enable identification and/or detection of a size, a shape, a convexity, and/or a geodesic distance of objects shown in the image.

In this way, analytics system 215 may improve feature extraction and/or object identification by causing edges, shapes, colors, or the like, of an object shown in the image to be exaggerated and/or separated from other objects shown in the image.

As further shown by FIG. 4, process 400 may include extracting a feature of the object shown in the set of images based on processing the set of images (block 430). For example, analytics system 215 may extract a feature of the object shown in an image based on processing the image. In some implementations, analytics system 215 may extract the feature of the object in association with processing the set of images.

In some implementations, analytics system 215 may process an image to identify objects shown in the image, edges of objects shown in the image, or the like. For example, analytics system 215 may use a feature extraction model that is compatible with pattern recognition, machine learning, and/or computer vision to extract a feature of an object shown in the image.

In some implementations, analytics system 215 may use a Canny edge detection technique to extract a feature of an object shown in an image. For example, when applying the Canny edge detection technique, analytics system 215 may use a multistage algorithm to apply a Gaussian filter to reduce noise in the image. As another example, analytics system 215 may use the Canny edge technique to identify an intensity gradient of the image by identifying horizontal, vertical, and diagonal edges in the image. As another example, analytics system 215 may use the Canny edge detection technique to perform non-maximum suppression on edges in the image by comparing strengths of pixels along the edge of the image and in positive and negative gradient directions.

As another example, when using the Canny edge detection technique, analytics system 215 may apply a double threshold to gradient values of edge pixels to reduce edges caused by noise and color variation. By using the Canny edge detection technique, analytics system 215 may improve feature extraction by enabling analytics system 215 to improve identification of edges in the image.

Alternatively, or additionally, analytics system 215 may use a Fourier transform technique to extract a feature of an object shown in an image. For example, analytics system 215 may transform sinusoidal patterns of an image from a spatial domain, such as patterns in a horizontal axis (e.g., an x-axis), to a frequency domain. In some implementations, analytics system 215 may pass the Fourier-transformed image through a filter, such as a high-pass filter, a low-pass filer, a band-pass filter, or the like, to simplify the image. In some implementations, the image may be simplified for use in pattern recognition, machine learning, or the like. By using a Fourier transform technique, analytics system 215 may improve feature extraction by simplifying the image.

In some implementations, analytics system 215 may use a histogram equalization technique and/or a histogram back projection technique to extract a feature of an object shown in an image. For example, analytics system 215 may use a histogram equalization technique to increase contrast of the image by distributing the most frequent intensity values of pixels to modify a histogram of the image. Alternatively, or additionally, analytics system 215 may use a histogram back projection technique by applying a histogram for an object in a first image to a second image to generate a third image. In some implementations, each pixel of the third image may represent a probability that the corresponding pixel of the second image belongs to the object in the first image used to generate the histogram. By using a histogram equalization technique and/or a histogram back projection technique to extract a feature of an object shown by an image, analytics system 215 may enable differentiation of objects in the image from other known objects in the image, thereby improving feature extraction.

In some implementations, analytics system 215 may use a template matching technique to extract a feature of an object. For example, analytics system 215 may use a template image to identify portions of an image that match the template image by comparing the template image to multiple portions of the image. Using a template matching technique to extract a feature of an object may enable analytics system 215 to efficiently identify features and/or object parameters.

In some implementations, analytics system 215 may use a watershed technique to extract a feature of an object shown by an image. For example, analytics system 215 may use an algorithm to identify local minima in a gradient image to generate a watershed image. In some implementations, the watershed image may use local minima as markers, such that an over-segmentation of the image is produced. Then, in some implementations, regions may be merged on the basis of a similarity criterion. By using a watershed technique to extract a feature of an object, analytics system 215 may segment portions of the image to enable efficient identification of features of portions of the image.

As further shown by FIG. 4, process 400 may include identifying the object parameter of the object shown in the set of images based on processing the set of images and/or extracting the feature of the object (block 440). For example, analytics system 215 may identify the object parameter of the object shown in an image of the set of images based on processing the image and/or extracting the feature of the object. In some implementations, analytics system 215 may use an object level technique to identify object parameters (e.g., a shape, an edge, etc.) in the image.

In some implementations, analytics system 215 may use a convex hull technique to identify a set of points associated with an object parameter, and may identify a convex set for the points. In some implementations, the convex set of may define edges and/or a shape of the object. Using the convex hull technique may enable analytics system 215 to efficiently identify object parameters in the image.

In some implementations, and in a gaming context, analytics system 215 may use the convex set to identify a shape of playing cards and/or betting chips in an image based on identifying a polygonal shaped convex hull for the playing cards or a circular shaped convex hull for the betting chips. Alternatively, or additionally, and in a manufacturing context, analytics system 215 may use the convex set to identify a shape of a component and/or a worker in a manufacturing plant based on identifying a polygonal shaped convex hull for the component or a circular shaped convex hull for a hard hat of the worker. Alternatively, or additionally, and in an airport context, analytics system 215 may use the convex set to identify a shape of luggage or items in luggage (e.g., using an x-ray image) based on identifying a polygonal shaped convex hull for the luggage or the items.

In some implementations, analytics system 215 may annotate the image based on identifying the object parameter and/or the object. For example, analytics system 215 may draw contours for the object, may outline edges of the object, and/or may provide the image with annotation for display via a display of client device 210. In this way, analytics system 215 may enable a user of client device 210 to visualize objects that analytics system 215 has identified.

As further shown by FIG. 4, process 400 may include adjusting identification of the object parameter using another set of images (block 450). For example, analytics system 215 may adjust identification of the object parameter using another set of images. In some implementations, analytics system 215 may adjust identification of the object parameter based on, or in association with, identifying the object parameter.

In some implementations, analytics system 215 may adjust identification of the object parameter using another image and/or structured data (e.g., data that identifies a camera angle and/or a camera location of a camera associated with an image, a camera make and/or model, a time of day at which an image was captured, etc.). For example, analytics system 215 may adjust identification of the object parameter by annotating or marking additional objects (e.g., with an identifier), unmarking an identified object (e.g., by removing the identifier), or the like, based on other images and/or structured data.

In some implementations, analytics system 215 may compare information identifying objects identified in a first image to determine whether there are differences between objects identified in the first image and objects identified in a second image. For example, and in a gaming context, analytics system 215 may compare information identifying images of the same gaming table (e.g., from multiple camera vantage points), images of the same type of gaming table, or the like, to determine whether there are differences between objects identified in a first image and objects identified in a second image.

In some implementations, analytics system 215 may adjust identification of objects in a first image and/or a second image (e.g., by identifying additional objects or unmarking previously identified objects). For example, and in a gaming context, if an object is identified in a first image of a particular gaming table but is not identified in a second image of the particular gaming table, analytics system 215 may identify the object in the second image using the first image or may unmark the object in the first image.

In some implementations, and continuing with the previous example, analytics system 215 may determine that application of a structuring element to the first image results in identification of betting chips in a particular betting slot on a gaming table. If application of the structuring element to the second image of the same gaming table (e.g., from a different vantage point) does not result in identification of the betting chips, then analytics system 215 may determine whether the extent to which the structuring element matches the betting chips in the first image satisfies a threshold. If the extent to which the structuring element matches the betting chips in the first image satisfies a threshold, then analytics system 215 may mark betting chips in the second image, despite not initially identifying the betting chips in the second image using the structuring element.

As another example, and in a manufacturing context, if a component is identified in a first image of a series of images of a particular workstation in a manufacturing plant but not identified in a second image of the particular workstation, analytics system 215 may identify a component in the second image of the workstation using the first image of the workstation or may unmark the component in the second image of the workstation. In some implementations, and continuing with the previous example, analytics system 215 may identify a component in the second image or unmark a component identified in the first image based on the extent to which a structuring element matches a component identified in the first image, in a manner similar to what was described above.

For example, if the extent to which a structuring element matches a component in a first image satisfies a threshold, analytics system 215 may identify a previously unmarked component in a second image (e.g., of the same location as the first image but from a different vantage point). Conversely, and as another example, if the extent to which a structuring element matches a component in a first image does not satisfy a threshold, and if analytics system 215 does not identify the component in a second image (e.g., of the same location as the first image but from a different vantage point), analytics system 215 may unmark the previously identified component in the first image.

As another example, and in an airport context, if luggage is identified in a first image of a series of images of a particular region of interest in an airport but not identified in a second image of the particular region of interest in the airport, analytics system 215 may identify the luggage in the second image using the first image or may unmark the luggage in the second image. In some implementations, and continuing with the previous example, analytics system 215 may identify or unmark luggage in the first image or the second image based on the extent to which a structuring element matches luggage identified in the first image and/or whether the luggage was identified in the second image, in a manner similar to what was described above. This improves identification of an object in an image by enabling analytics system 215 to correct inaccurate identification of an object in an image.

As described above, in some implementations, analytics system 215 may use structured data to adjust the identification of the image. For example, the structured data may include data identifying a camera angle relative to a fixed point, a camera location, a camera make, a camera model, a time of day, or the like. In some implementations, analytics system 215 may use structured data identifying a camera angle to determine and/or adjust an angle of projection for a layout of a gaming table, a workstation, a region of interest in an airport, or the like. This improves identification of an object by enabling analytics system 215 to correct for camera perspectives that may make object identification difficult. Alternatively, or additionally, analytics system 215 may use structured data about the time of day to determine whether to adjust contrast using a histogram equalization technique based on whether the image is an image captured during the day or an image captured at night.

In some implementations, analytics system 215 may receive the structured data from image capture system 205. For example, analytics system 215 may receive the structured data at the same time as receiving the images, at a time that is different from the time images are received, and/or based on requesting the structured data from image capture system 205.

As further shown by FIG. 4, process 400 may include associating the identification of the object parameter with a metric (block 460). For example, analytics system 215 may associate the identification of the object parameter with a metric. In some implementations, a metric may include a measurement associated with identification of an object in an image.

In some implementations, the metric may be based on, or associated with, a context. For example, in a gaming context, a metric may include a quantity of games completed (e.g., full games), a quantity of bets, a quantity of rounds (e.g., betting rounds), a quantity of main bets, a quantity of side bets, an indication of whether playing cards are in play, or the like. As another example, in a manufacturing context, a metric may include a quantity of components at a workstation, a quantity of video frames during which a component is at a workstation (e.g., indicating an amount of time that a component is at the workstation), a quantity of times a worker leaves a workstation (e.g., within a period of time), or the like. As another example, in a public safety context, such as an airport context, a metric may include a quantity of attended bags, a quantity of unattended bags, a quantity of people in a location, a quantity of potentially prohibited items in a piece of luggage (e.g., identified in an x-ray image from a backscatter x-ray unit), or the like.

In some implementations, analytics system 215 may associate the identification of an object with a metric based on a rule, a policy, or the like. For example, and in a gaming context, analytics system 215 may associate identification of playing cards in an image with a metric that indicates a quantity of rounds (e.g., betting rounds) played based on a rule. As another example, and in a manufacturing context, analytics system 215 may associate identification of a malformed component with a metric that indicates a failure rate or an error rate of a manufacturing process. As another example, and in a public safety context, analytics system 215 may associate identification of a person with a metric that indicates a quantity of people in a structure, a location, etc.

In some implementations, analytics system 215 may store information identifying a set of metrics (e.g., metrics to be tracked) and may map the information to objects identified in images. For example, analytics system 215 may store the information identifying the set of metrics using a data structure, and may map the information to associate the identification of an object with a metric, such that identification of the object in an image may cause analytics system 215 to update a value for the metric, as described in more detail below.

In this way, analytics system 215 may use, for example, a set of computer vision algorithms that includes edge detection, signal processing based on feature extraction, template matching, color segmentation, histogram equalization, or contour and convex hulls, to extract features of objects shown in an image. This enables analytics system 215 to generate a repository or library of training images that can be used to separate image noise from geometry of objects in the image (e.g., can be used to separate noise from geometry of objects/layout of a gaming table).

In addition, using the set of computer vision algorithms and/or other processing techniques may improve object detection, improve feature extraction, and/or enable analytics system 215 to identify different features shown in the image. For example, using an edge detection technique may improve/enable detection of edges of objects being exposed to different lighting conditions, which may improve object detection when shadows are caused by other objects in the image. As another example, using a signal processing technique may improve/enable filtering of different levels of noise caused by motion blur in the image.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 of an example process for processing an image to identify a metric associated with the image and/or to determine a value for the metric. In some implementations, one or more process blocks of FIG. 5 may be performed by analytics system 215. In some implementations, one or more process blocks of FIG. 5 may be performed by another device or a group of devices separate from or including analytics system 215, such as image capture system 205 and/or client device 210.

As shown by FIG. 5, process 500 may include receiving, from an image capture system, a set of images associated with a video feed (block 510). For example, analytics system 215 may receive, from image capture system 205, a set of images associated with a video feed. In some implementations, a video feed may include a set, or series, of images (e.g., still images) captured by a camera associated with image capture system 205 over a period of time, in real time, and/or in near real time, and which may be provided for display at a rate that creates an appearance of motion.

In some implementations, analytics system 215 may receive images from image capture system 205 automatically (e.g., as images are captured, according to a schedule, or the like). Alternatively, or additionally, analytics system 215 may receive images from image capture system 205 based on a request (e.g., based on a user of client device 210 providing an indication to request the images, requesting according to a schedule, or the like).

In some implementations, analytics system 215 may receive multiple sets of images from image capture system 205. For example, analytics system 215 may receive, from image capture system 205, a first set of images associated with a first video feed and a second set of images associated with a second video feed. Alternatively, or additionally, analytics system 215 may receive, from image capture system 205, multiple sets of images associated with the same video feed or different video feeds. In some implementations, analytics system 215 may receive a set of images that is not associated with a video feed, such as a set of independent, or unrelated, still images (e.g., rather than receiving a set of images associated with a video feed).

As further shown by FIG. 5, process 500 may include processing the set of images to identify an object shown in an image of the set of images (block 520). For example, analytics system 215 may process the set of images to identify an object shown in an image of the set of images. In some implementations, analytics system 215 may process the set of images based on, or in association with, receiving the set of images from image capture system 205.

In some implementations, analytics system 215 may process the set of images using one or more techniques (e.g., one or more image processing techniques). For example, analytics system 215 may process images using a color-space transformation technique, a histogram equalization technique, a de-noising technique, a smoothing and/or filtering technique, an Otsu method, a morphology technique, a Canny edges technique, a Fourier transform technique, a histogram back projection technique, a color based segmentation technique, a template matching technique, a watershed matching technique, or the like. In some implementations, analytics system 215 may process the set of images using the one or more techniques in a manner similar to that described above.

In some implementations, analytics system 215 may use a training set of images (e.g., RGB images from a training repository or library) to identify a region of interest in an image of the set of images. For example, and in a gaming context, analytics system 215 may identify a betting slot, a dealer, or a player in an image of the set of images. In some implementations, and continuing with the gaming context as an example, analytics system 215 may identify multiple regions of interest across games for each table and/or table layout. In some implementations, and continuing with the gaming context as an example, the multiple regions of interest may include different types and/or degrees of objects, features, image artifacts and/or noise (e.g., hand movements of dealers/players, lighting conditions of a gaming table, blurred edges of objects in the image, cash/coins on a gaming table, etc.).

In some implementations, analytics system 215 may need to identify one or more regions of interest in a set of images to enable a deep learning neural network to learn to identify an object in an image using a set of training images that may include different types and/or degrees of noise. Using deep learning neural networks enables determination and/or generation of increasingly complex rules for categorization and/or identification of objects in an image. In addition, using an optimal hyper-parameter tuning/configuration (e.g., learning rates, filters, epochs, or hidden layers) for each layer of convolution may cause a deep learning neural network to produce the strongest response (e.g., relative to other responses) to local input patterns, thereby improving an accuracy of identifying a value of a metric associated with an object.

In some implementations, analytics system 215 may process the set of images based on receiving the set of images from image capture system 205 and/or based on receiving an indication from a user of client device 210 to process the images. In some implementations, analytics system 215 may process one image at a time, multiple images in parallel, and/or multiple images in bulk.

As further shown by FIG. 5, process 500 may include identifying the object based on processing the set of images (block 530). For example, analytics system 215 may identify the object based on processing the set of images.

In some implementations, analytics system 215 may extract a feature from an image of the set of images and/or may identify an object parameter of the object. For example, analytics system 215 may use pattern recognition, machine learning, computer vision, or the like, to extract the feature from the image based on a training set. Alternatively, or additionally, analytics system 215 may use a convex hull technique, or the like, to identify object parameters in the image.

In some implementations, analytics system 215 may identify a context of an image based on identifying the object. For example, analytics system 215 may identify a context of an image as a gaming context by identifying betting slots, playing cards, and/or a gaming table layout, such as a Texas hold'em table layout or a Black Jack table layout, in the image. Continuing with the previous example, within a gaming context, analytics system 215 may identify a Texas hold'em context or a Black Jack context based on identifying an object shown in an image or based on identifying a layout of a gaming table. Alternatively, or additionally, analytics system 215 may identify the context of an image as a public safety context, such as an airport, by identifying airport logos and/or airline logos, baggage carts, luggage, or the like in the image. Alternatively, or additionally, analytics system 215 may identify a context of an image as a manufacturing context by identifying manufacturing components in the image, conveyor belts in the image, manufacturing equipment in the image, or the like.

In some implementations, analytics system 215 may identify the context of an image by identifying objects in the image and/or identifying information that identifies a context associated with an object in the image. For example, analytics system 215 may use a data structure to identify the information, such as a data structure that includes metadata about the image (e.g., a location of image capture system 205 that captured the image, a context of the image, etc.). As another example, to identify a context, analytics system 215 may compare a shape of the identified object to a training set of images and may identify metadata associated with the images included in the training set when the comparison indicates a match.

In some implementations, analytics system 215 may identify a context associated with multiple sets of images. For example, analytics system 215 may receive a first set of images and may identify a first context associated with the first set of images, and may receive a second set of images and may identify a second context associated with the second set of images. Alternatively, or additionally, analytics system 215 may identify the same context for multiple sets of images and/or may identify different contexts for different sets of images.

Alternatively, or additionally, analytics system 215 may identify additional objects based on identifying the context. For example, analytics system 215 may reprocess images to identify additional objects based on identifying the context, such as objects specific to the context of the images (e.g., by using a training set of images specific to the context, using structuring elements for specific objects associated with the context, etc.). Continuing with the previous example, in a gaming context, when analytics system 215 identifies the context of the set of images as a Texas hold'em game, analytics system 215 may use particular structuring elements for a Texas hold'em game to identify playing cards, such as hole cards or cards in play, bet slots, such as main bet slots, side bet slots, or play bet slots, or the like (e.g., rather than using particular structuring elements for a Blackjack game or another type of game). Processing the images in this way may conserve processing resources of analytics system 215 by preventing analytics system 215 from having to process images to identify objects associated with multiple contexts.

In some implementations, identification of an object may be associated with an event (e.g., identification and/or detection of an event). For example, and in a public safety context, detection of an object in an image may be associated with detection of an intrusion into a particular location. As another example, and in a gaming context, detection of an object in an image may be associated with detection of a player of a game placing a bet or the completion of a round of game play. As another example, and in a manufacturing context, detection of an object (e.g., a malformed object) may be associated with detection of a failed or faulty manufacturing process.

As further shown by FIG. 5, process 500 may include determining whether the identified object is associated with contributing to a value of a metric (block 540). For example, analytics system 215 may determine whether the identified object is associated with contributing to a value of a metric. In some implementations, analytics system 215 may determine whether the identified object is associated with contributing to a value of a metric using metadata associated with images in the training set or a data structure associated with images in the training set and/or objects identified in the images.

In some implementations, analytics system 215 may identify a metric by comparing an object identified in an image to objects included in the images of the training set. In some implementations, analytics system 215 may determine that the object is associated with contributing to a value of a metric where the comparison of the object and objects included in images of the training set indicates a match and analytics system 215 determines that the objects included in the images of the training set are associated with contributing to a value of a metric (e.g., using metadata or a data structure).

In some implementations, analytics system 215 may identify a metric associated with a context identifier that identifies a context. For example, the context identifier may be associated with the identified object in a data structure, and the data structure may include a set of context identifiers and corresponding metric identifiers. In some implementations, analytics system 215 may identify the metric based on identifying the context of an image and identifying a corresponding context identifier in the data structure. In some implementations, analytics system 215 may determine whether an identified object is associated with contributing to a value of a metric based on determining whether the identified object is associated with the same context as the metric.

In some implementations, analytics system 215 may determine whether the object is associated with another object when determining whether the object is associated with contributing to a value of a metric (e.g., whether a combination of objects is associated with contributing to a value of a metric). This enables analytics system 215 to identify a combination of objects in an image and/or to determine whether the combination of objects contributes to a value of a metric based on identifying the combination of objects. For example, and in a gaming context, analytics system 215 may determine whether an identified betting chip is present within an identified betting slot. If the identified betting chip is present within an identified betting slot, then analytics system 215 may determine that the identified betting chip is associated with contributing to a value of a metric (e.g., a metric that indicates a quantity of bets, a quantity of different types of bets, an amount of money being bet, etc.). If the identified betting chip is not present within an identified betting slot, then analytics system 215 may determine that the identified betting chip is not associated with contributing to a value of a metric.

As another example, and in a public safety context, analytics system 215 may determine whether an identified piece of luggage is associated with (e.g. proximate to) an identified traveler. If the identified luggage is associated with an identified traveler, then analytics system 215 may determine that the identified luggage is associated with contributing to a value of a metric (e.g., a quantity of attended pieces of luggage, a quantity of unattended pieces of luggage, etc.). If the identified luggage is not associated with (e.g., not proximate to) an identified traveler, then analytics system 215 may determine that the identified luggage is not associated with contributing to a value of a metric.

As another example, and in a manufacturing context, analytics system 215 may determine whether an identified manufacturing component is located at an identified workstation. If the identified manufacturing component is located at an identified workstation, then analytics system 215 may determine that the identified manufacturing component is associated with contributing to a value of a metric (e.g., a quantity of components at a workstation, a quantity of assembled or unassembled products at a workstation, etc.).

If the identified manufacturing component is not located at an identified workstation, then analytics system 215 may determine that the identified manufacturing component is not associated with contributing to a value of a metric.

As further shown by FIG. 5, process 500 may include updating the metric based on determining that the identified object is associated with contributing to the value of the metric (block 550) and providing, for display, information identifying the value of the metric (block 560). For example, analytics system 215 may update the metric based on determining that the identified object is associated with contributing to the value of the metric (e.g., by updating a value of the metric). In some implementations, analytics system 215 may store information identifying the value of the metric (e.g., in a data structure or using memory resources of analytics system 215). Additionally, or alternatively, analytics system 215 may provide information identifying a value for the metric for display (e.g., via a display of client device 210). For example, in a gaming context, analytics system 215 may provide, for display, information identifying values for metrics for a Texas hold'em game, such as a quantity of games completed (e.g., full games), a quantity of rounds (e.g., betting rounds) played, a quantity of main bets, a quantity of side bets, etc.

As further shown by FIG. 5, process 500 may include performing an action based on the value of the metric and/or based on identifying the object (block 570). For example, analytics system 215 may perform an action based on a value of the metric and/or based on identifying the object. In some implementations, analytics system 215 may perform the action in association with updating the metric and/or providing the information identifying the value of the metric for display.

In some implementations, analytics system 215 may generate a report and/or a notification. For example, in a gaming context, analytics system 215 may generate a report on projected revenue for a particular gaming table or dealer, or potential fraud occurring at a gaming table (e.g., based on betting patterns or game play patterns identified across multiple images). In some implementations, the report may be based on identifying betting patterns of players, winnings, losings, or the like of one or more gaming tables. Alternatively, or additionally, analytics system 215 may generate a report on betting patterns of particular players or at particular tables. In some implementations, the report may be used to identify and/or track cards in play, bets, betting fraud, to identify game players to receive complimentary services, or the like.

As another example, in a manufacturing context, analytics system 215 may generate a report on component and/or worker movements. In some implementations, the report may be used to identify inefficiencies related to component and/or worker movement. Alternatively, or additionally, analytics system 215 may generate a report on irregular objects present in the images. In some implementations, this report may be used for quality control purposes in the manufacturing facility.

As another example, in a public safety context, such as an airport context, analytics system 215 may generate a report on the presence of unexpected and/or prohibited items in luggage (e.g., based on images from a backscatter x-ray unit). Alternatively, or additionally, analytics system 215 may generate a report on the presence of items in an unexpected or prohibited state, such as luggage in an unattended state when luggage is expected to be in an attended state, for example. Alternatively, or additionally, analytics system 215 may generate a report on a quantity of people present in a particular location, for the purpose of determining whether a maximum occupancy has been reached, for example.

In some implementations, analytics system 215 may automatically send a message (e.g., to another device, to an operator of image capture system 205 or another individual, etc.). For example, in a gaming context, analytics system 215 may send a message to the operator to notify the operator about activity at a particular gaming table and/or to casino security to investigate the activity. As another example, in a public safety context, analytics system 215 may send a message to a fire marshal when analytics system 215 detects a quantity of people at a premises that violates a fire code. As another example, and in a manufacturing context, analytics system 215 may send a message and/or a command to a manufacturing system, and/or a plant worker, to remove a damaged or malformed component.

As another example, analytics system 215 may transmit a message and/or a command to a scheduling system or a dispatch system, such as to schedule or dispatch law enforcement personnel, security personnel, a property manager, an unmanned aerial vehicle, or the like, to the location associated with an image. As another example, analytics system 215 may transmit a message or a command to image capture system 205 to cause image capture system 205 to transmit additional images of a location to analytics system 215 or to cause image capture system 205 to direct one or more additional cameras at a particular location, such as to capture images of the particular location from multiple vantage points. As another example, analytics system 215 may transmit a message to image capture system 205 to record and/or store images that would be discarded. Automatically sending the message may increase an efficiency of acting on changes in the metrics, thereby facilitating and/or improving response to the changes.

In some implementations, when performing the action, analytics system 215 may automatically schedule a meeting. For example, analytics system 215 may automatically schedule a meeting among managers of a casino, among managers of a manufacturing plant, and/or among public safety personnel, such as law enforcement officers, fire fighters, airport security, or the like. In some implementations, analytics system 215 may automatically schedule the meeting by identifying available times for the meeting using electronic calendars for potential meeting attendees and sending a meeting request to the potential meeting attendees.

In some implementations, analytics system 215 may perform an action based on a context of an image. For example, and in a casino context, analytics system 215 may send a message to put a hold on a player's account, apply credit to a player's room or account, send a message to a bartender or a waitress to deliver complementary food and/or beverages to a player, or analyze an image to determine whether players have food and/or beverages. As another example, and in a manufacturing context, analytics system 215 may automatically report a safety violation, automatically send a message to a worker to complete a task, or activate an alarm when an accident occurs in a manufacturing plant. As another example, and in a public safety context, analytics system 215 may activate an alarm or a security system, transmit a report to law enforcement about objects identified in an image, or transmit a message to smartphones in proximity to a location to notify people to clear an area.

In some implementations, performing the action may include updating the metric and/or providing, for display, information identifying the value of the metric. In other words, block 570 may include block 550 and/or block 560.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6A-6D are diagrams of an example implementation 600 relating to example process 400 shown by FIG. 4 and example process 500 shown by FIG. 5. For example, FIGS. 6A-6D show an example of process 400 and process 500 as applied to a public safety context.

Example implementation 600 shows an airport context including image capture system 205, analytics system 215, and client device 210. Image capture system 205 includes a camera and a server device. In example implementation 600, travelers in the airport move about and move luggage. Some travelers may be wearing particular articles of clothing, such as a hat. In some implementations, the article of clothing may have a particular color. For example, a traveler may be wearing a black hat and another traveler may be wearing a white hat. Assume for FIGS. 6A-6D, for example, that analytics system 215 has received and instruction (e.g., from client device 210) to identify a white hat in an image, such as based on a suspicious person report identifying an individual wearing a white hat, a missing person report identifying an individual wearing a white hat, or the like.

Figure 6A:
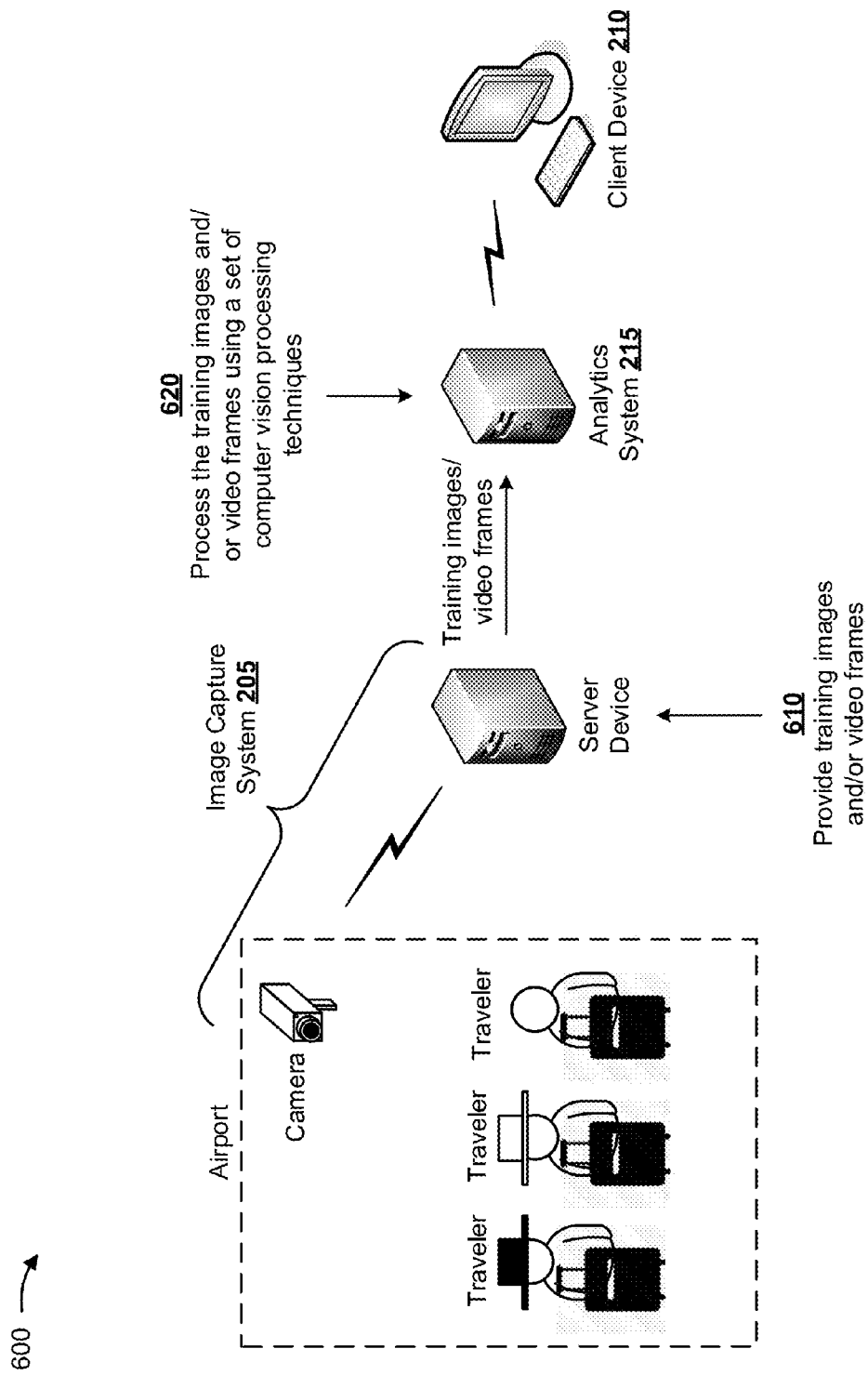
FIGS. 6A-6D are diagrams of an example implementation relating to the example processes shown in FIG. 4 and FIG. 5.

As shown in FIG. 6A, and by reference number 610, the server device in image capture system 205 may provide training images and/or video frames (e.g., historical images and/or video frames, previously recorded images and/or video frames, etc.) to analytics system 215. The training images and/or video frames may show the movement of the travelers (e.g., travelers wearing hats and travelers not wearing hats) within the airport. As shown by reference number 620, analytics system 215 may process the training images and/or video frames using a set of computer vision processing techniques and may extract features and/or parameters of an object in the training images to identify the object. For example, analytics system 215 may process the training images and/or extract features and/or object parameters using a technique, as described elsewhere herein. In some implementations, analytics system 215 may process the training images to identify particular objects and/or objects of a particular color.

Figure 6B:
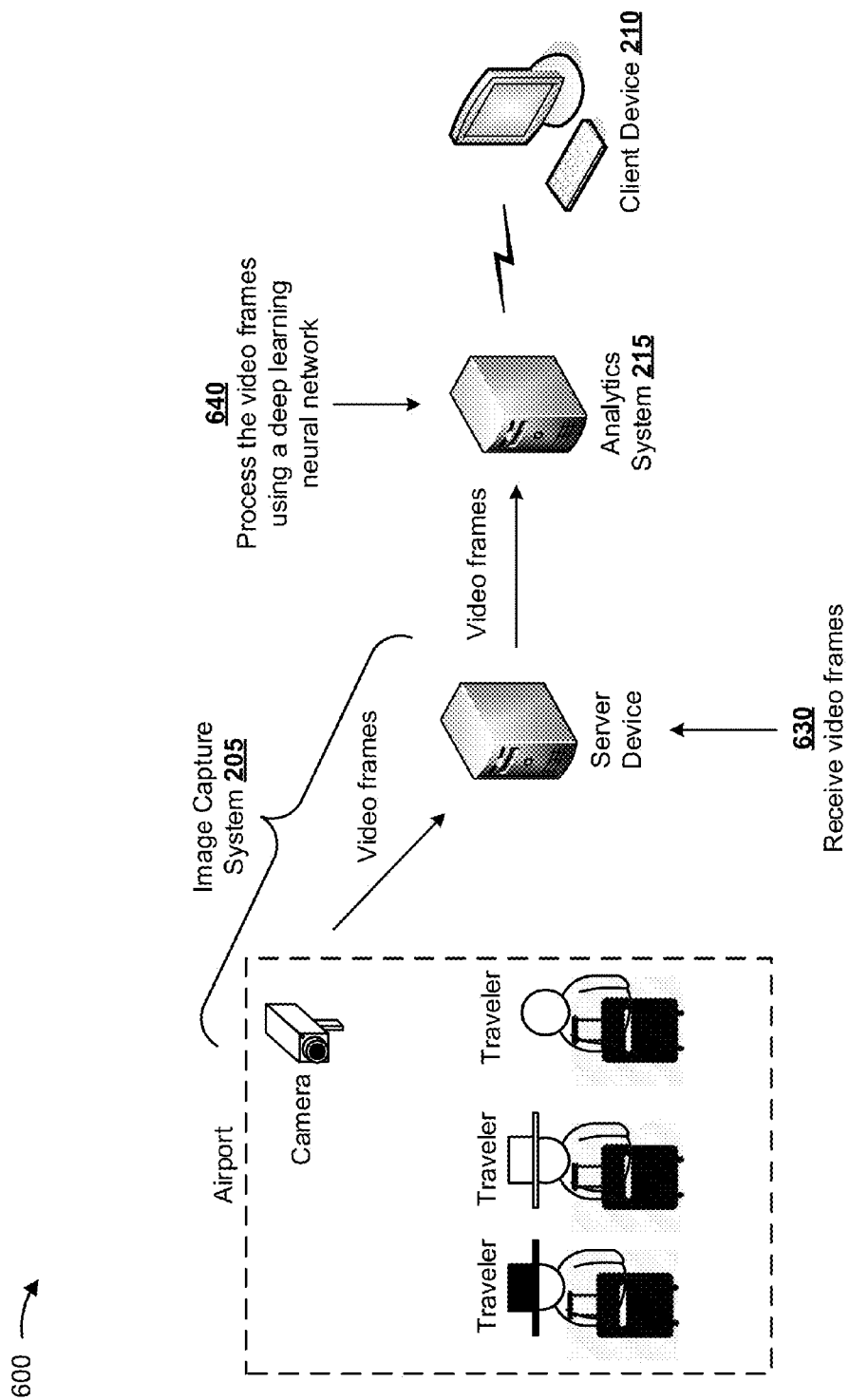

As shown in FIG. 6B, and by reference number 630, the server device may receive video frames (e.g., real-time or near real-time video frames or video frames not previously recorded) from the camera and provide the video frames to analytics system 215. For example, the camera may capture the video frames in real-time or near real-time and may provide the video frames to the server device. The server device may provide the video frames to analytics system 215 (e.g., in real-time or near real-time). As shown by reference number 640, analytics system 215 may process the video frames using a deep learning neural network to identify a context of the video frames. For example, analytics system 215 may process the video frames to identify the context of the video frames as an airport or public safety context using a technique, as described elsewhere herein. Further, in some implementations, processing the video frames may enable analytics system 215 to distinguish between different types of objects (e.g., distinguish travelers with hats from travelers without hats, distinguish an object of a particular color, such as a black hat, from another object of a different color, such as a white hat).

Figure 6C:
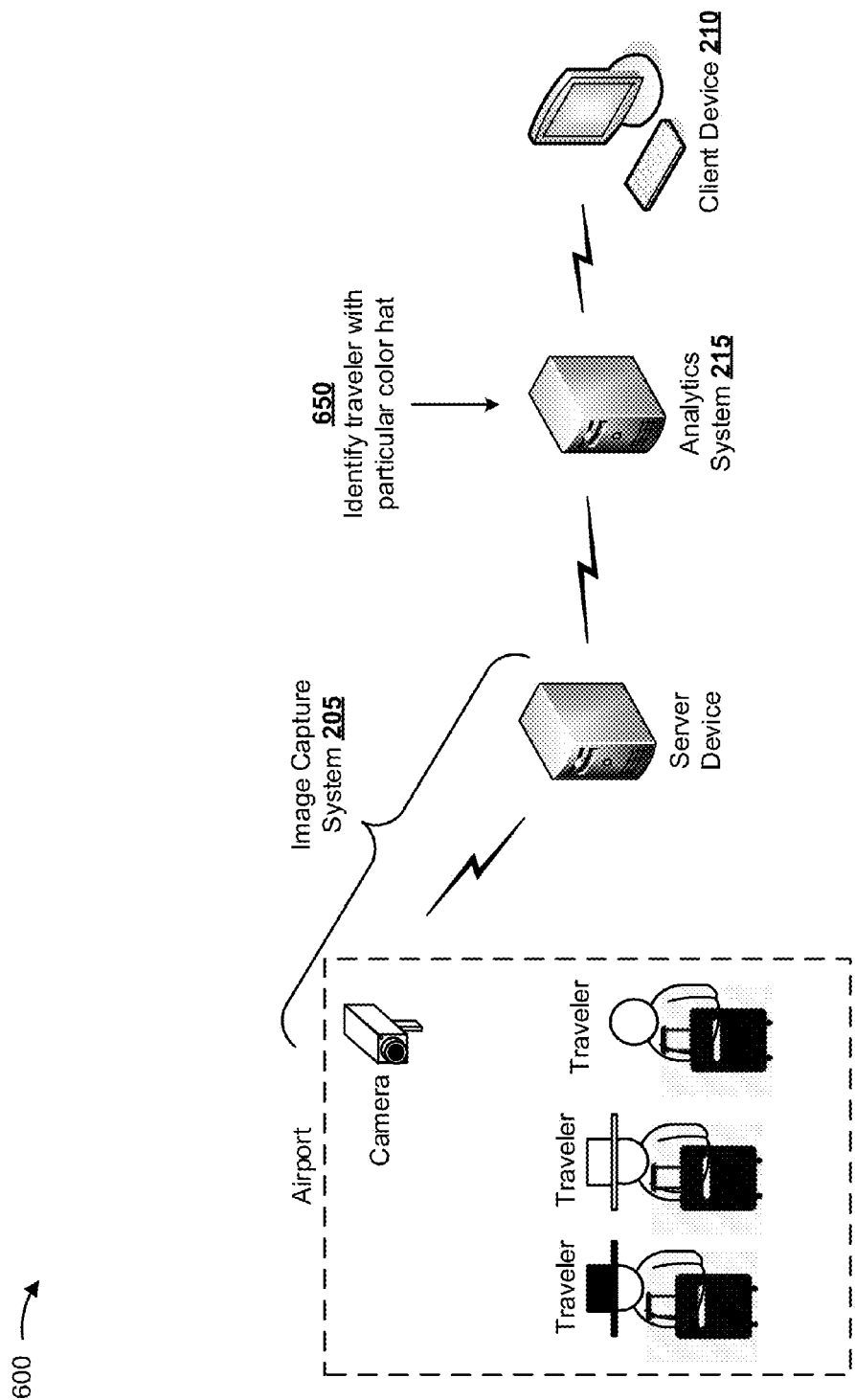

As shown in FIG. 6C, and by reference number 650, analytics system 215 may identify a particular color hat in the video frame. For example, analytics system 215 may identify the white hat using an image processing technique, as described elsewhere herein. Analytics system 215 may identify the particular color hat in the video frame in real-time or near real-time.

Figure 6D:
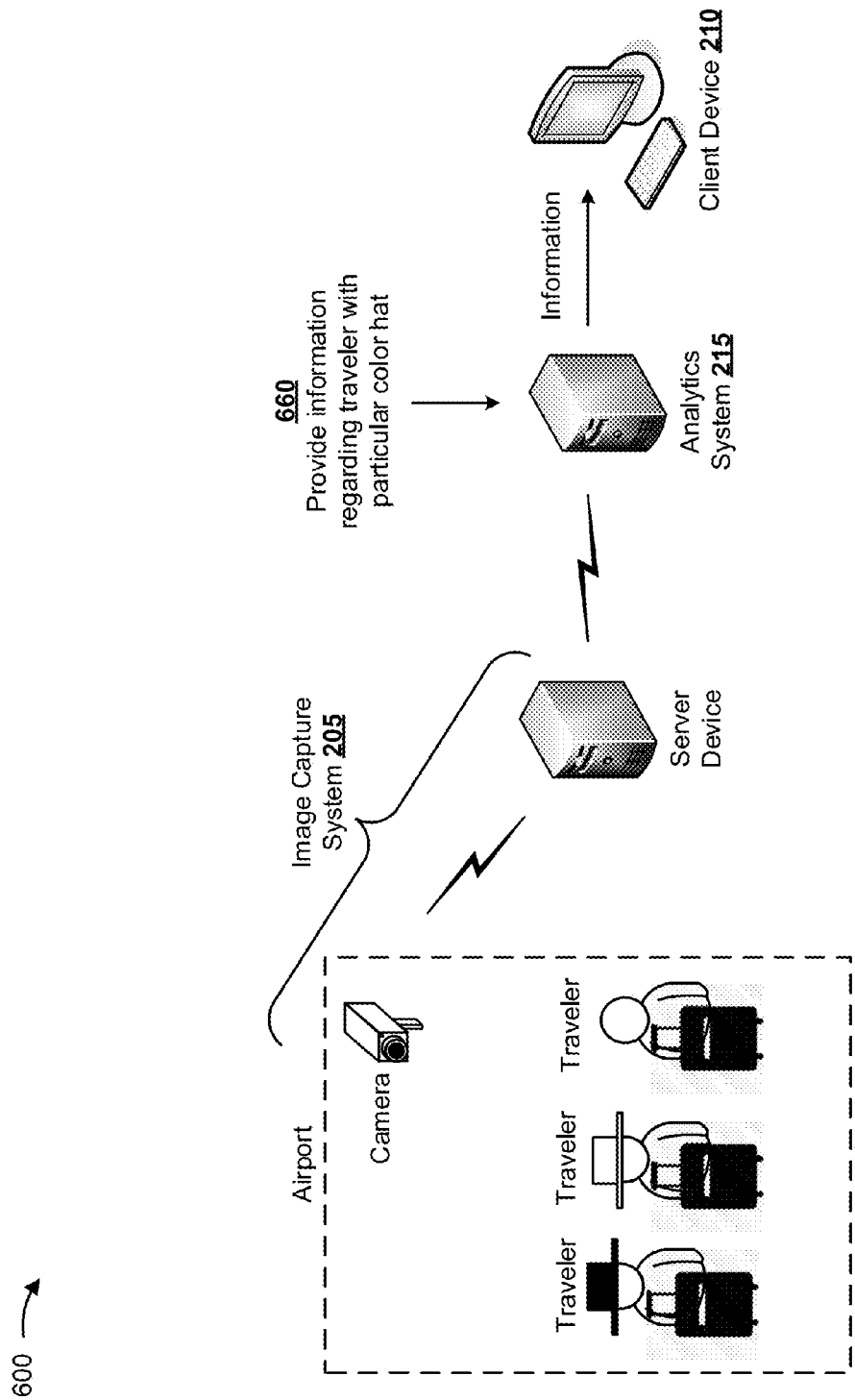

As shown in FIG. 6D, and by reference number 660, analytics system 215 may provide, for display via client device 210, information indicating that the traveler wearing the particular color hat was identified in the video frame. In addition, analytics system 215 may provide other information associated with identifying the particular color hat, such as a location of the traveler wearing the particular color hat (e.g., based on metadata that identifies the location of the camera that captured the image or other objects captured in the image). Analytics system 215 may perform another action based on identifying the particular color hat. For example, analytics system 215 may send a message to an airport security officer to investigate the traveler wearing the particular color hat.

As indicated above, FIGS. 6A-6D are provided merely as an example. Other examples are possible and may differ from what was described with regard to FIGS. 6A-6D. For example, analytics system 215 may identify an article of clothing other than a hat or an item of a particular color other than an article of clothing.

Figure 7A:
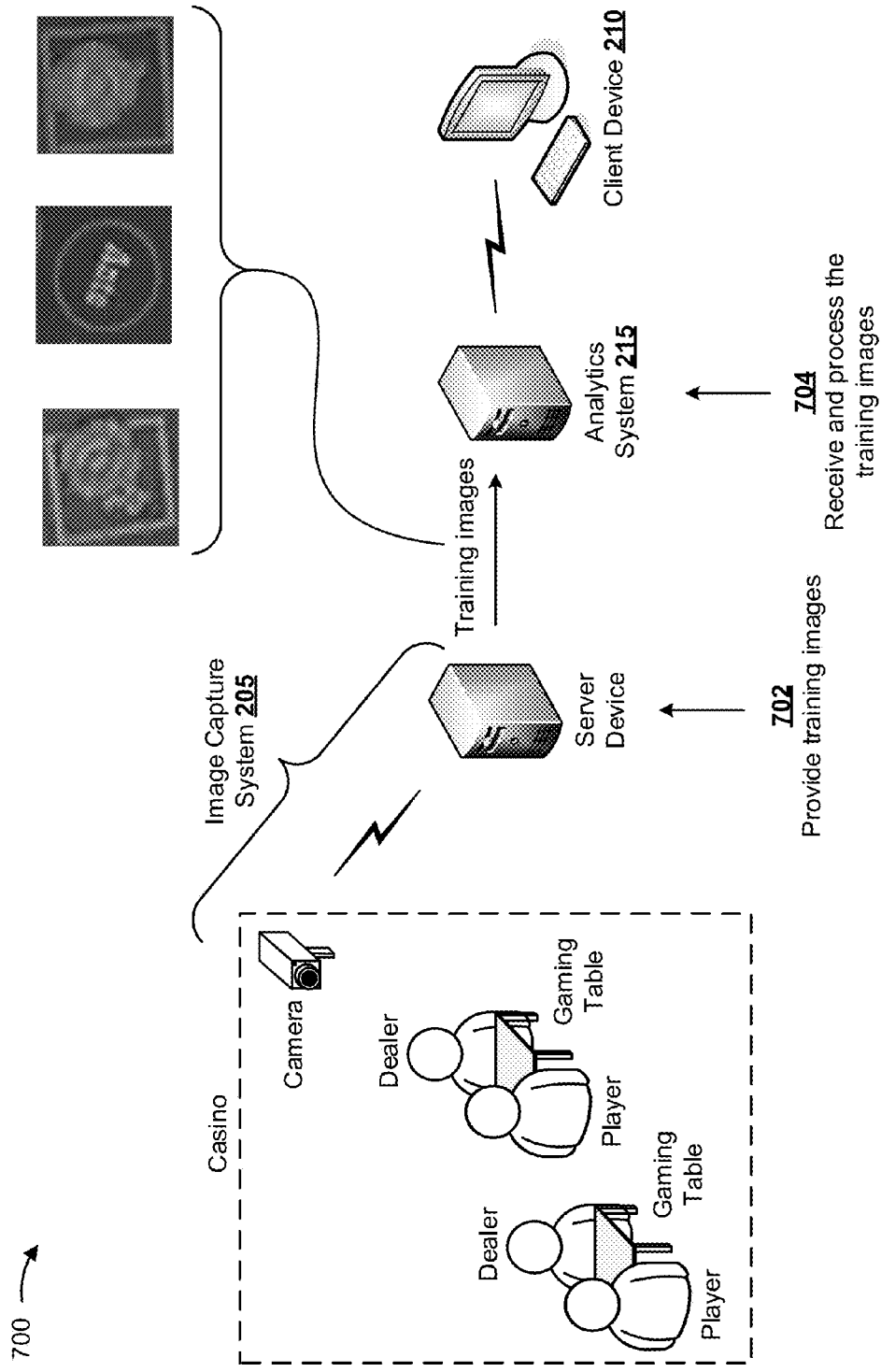
FIGS. 7A-7N are diagrams of an example implementation relating to the example processes shown in FIG. 4 and FIG. 5.
Figure 7B:
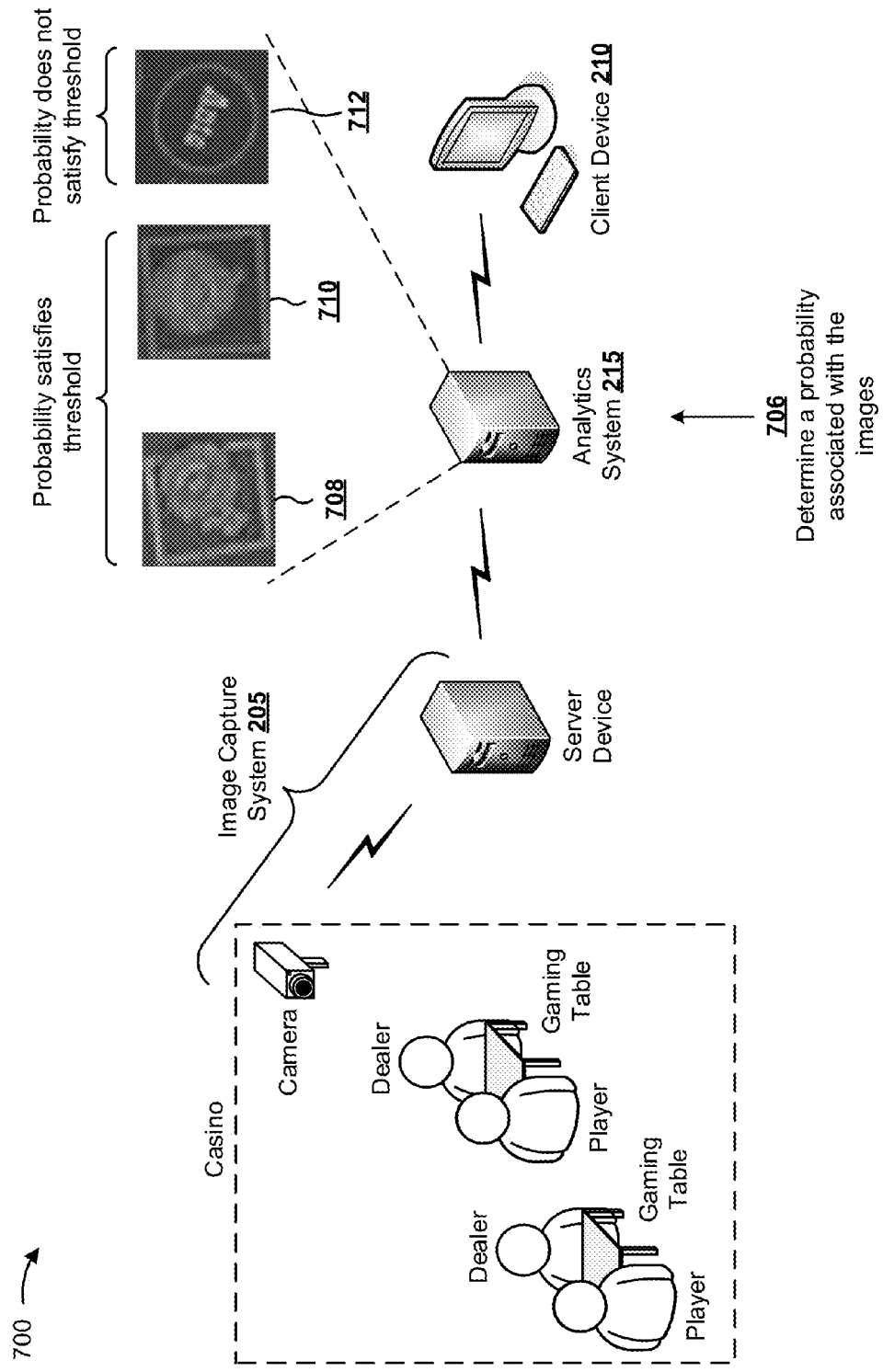
Figure 7C:
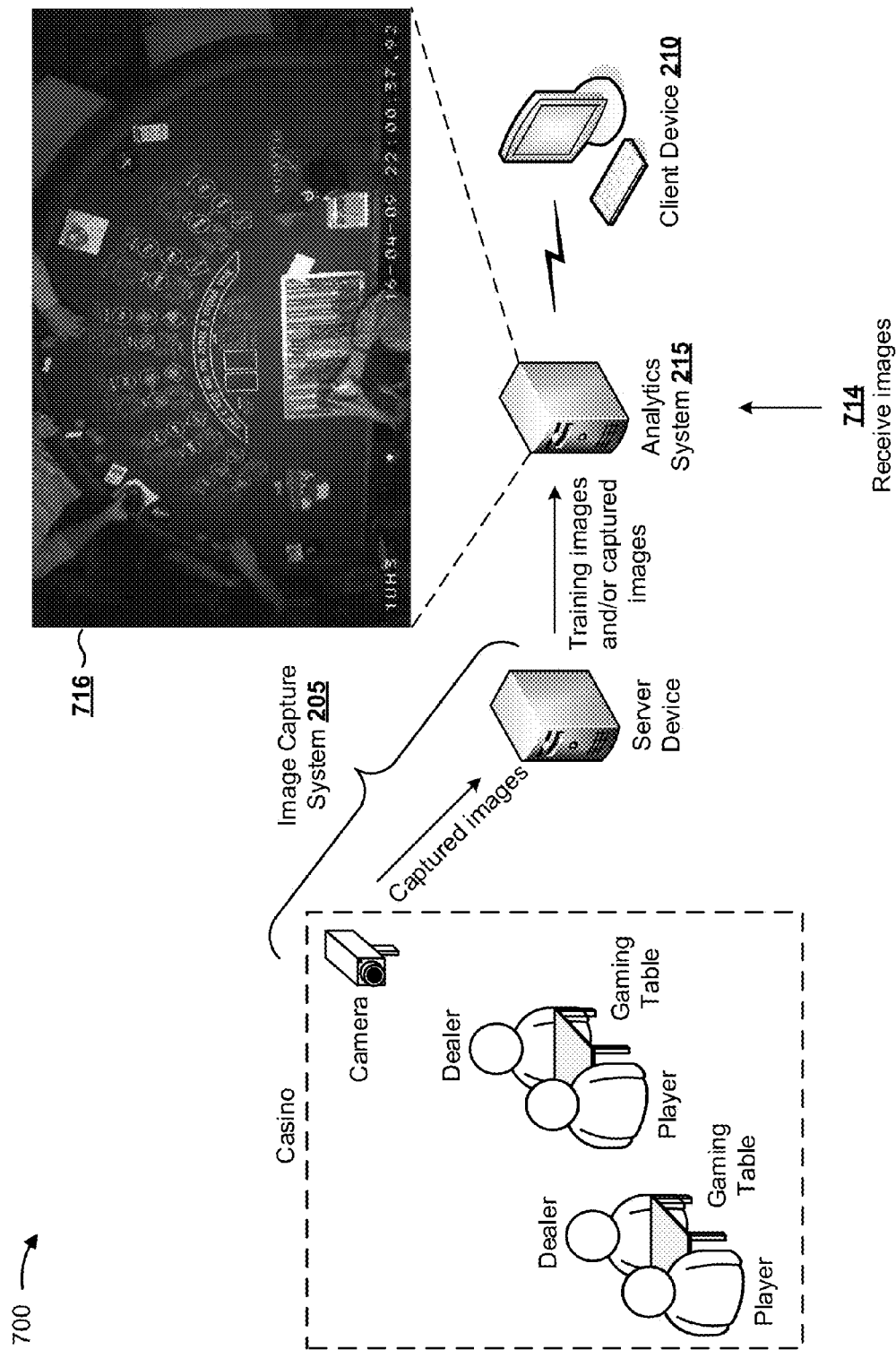
Figure 7D:
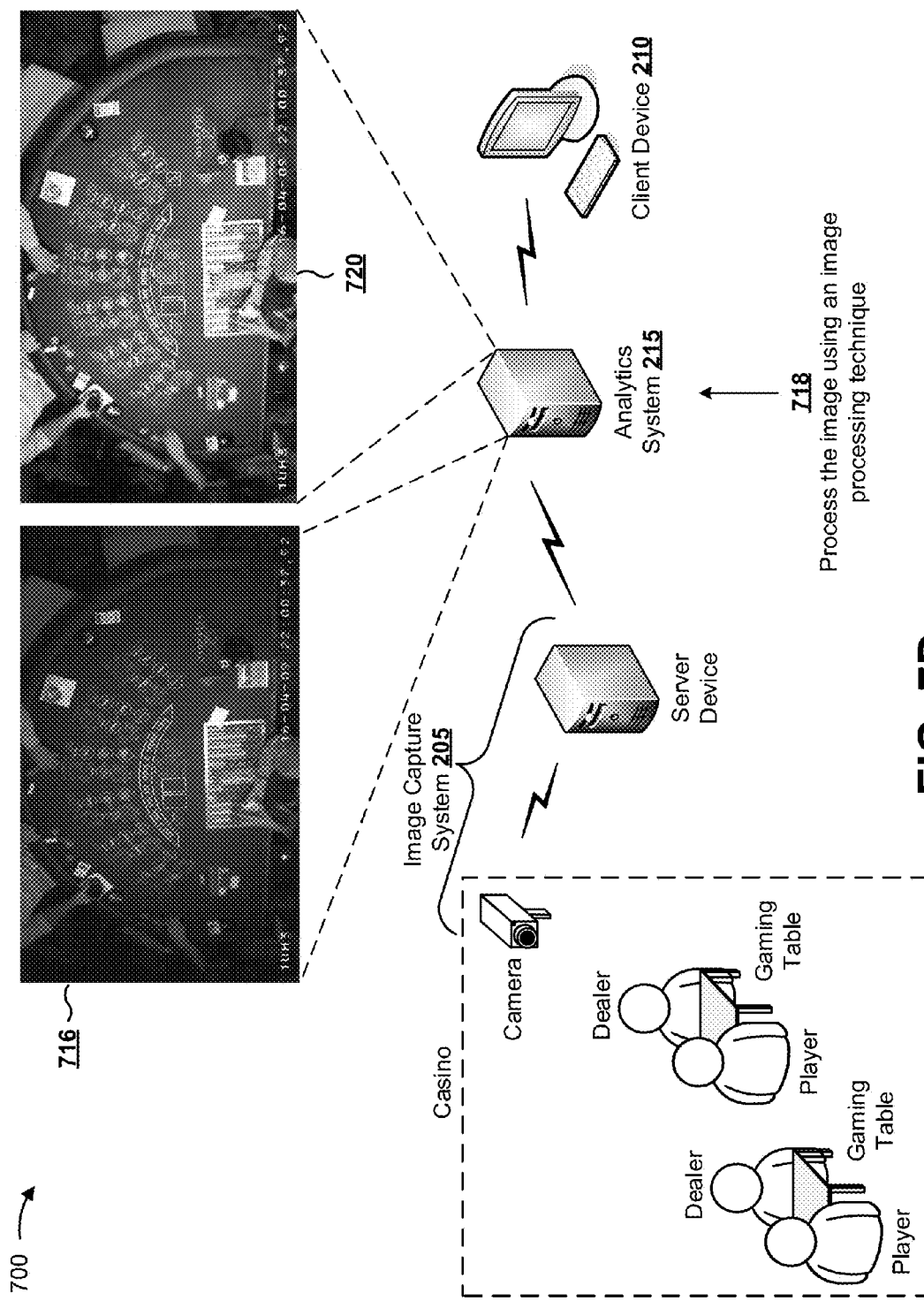
Figure 7E:
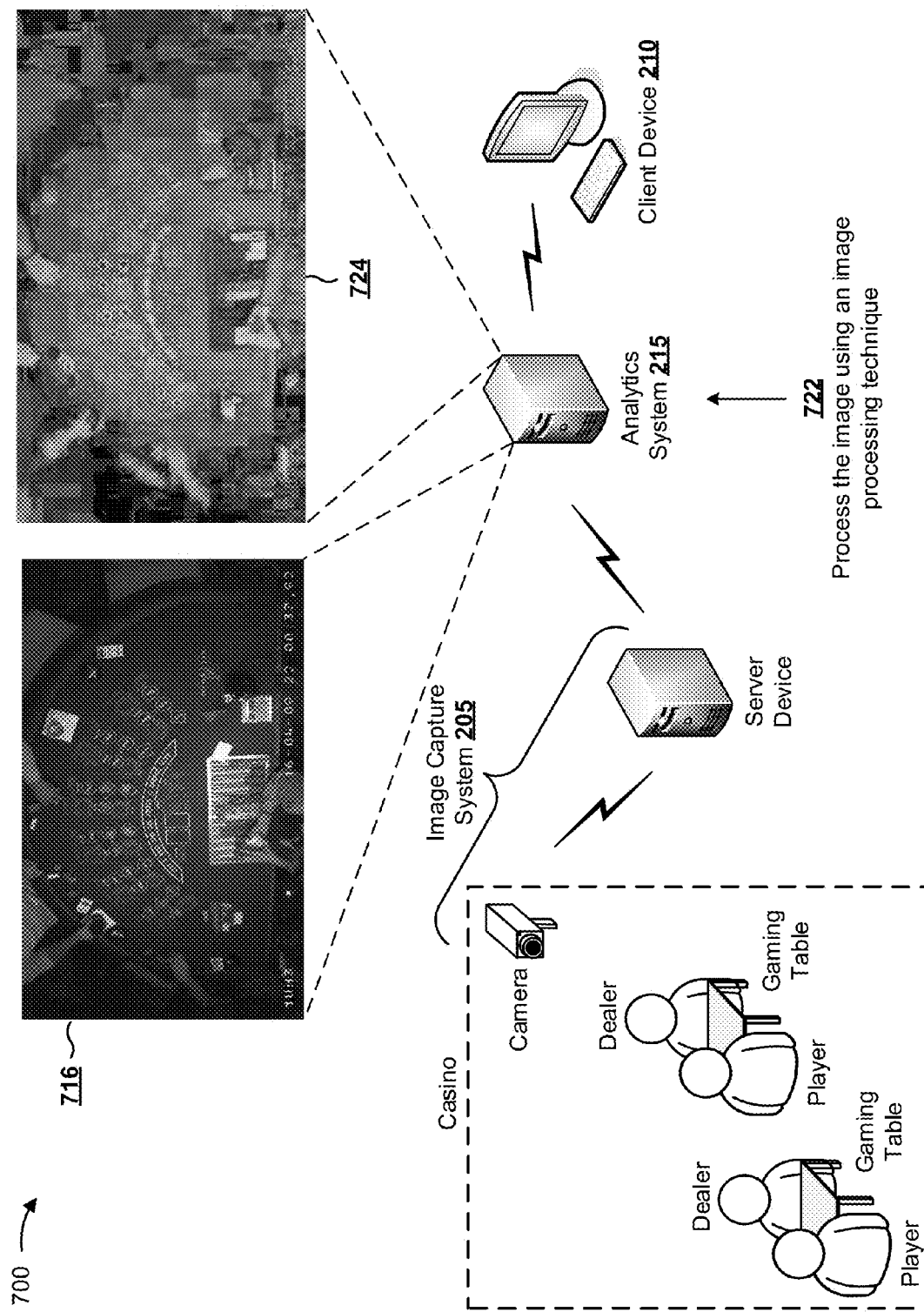
Figure 7F:
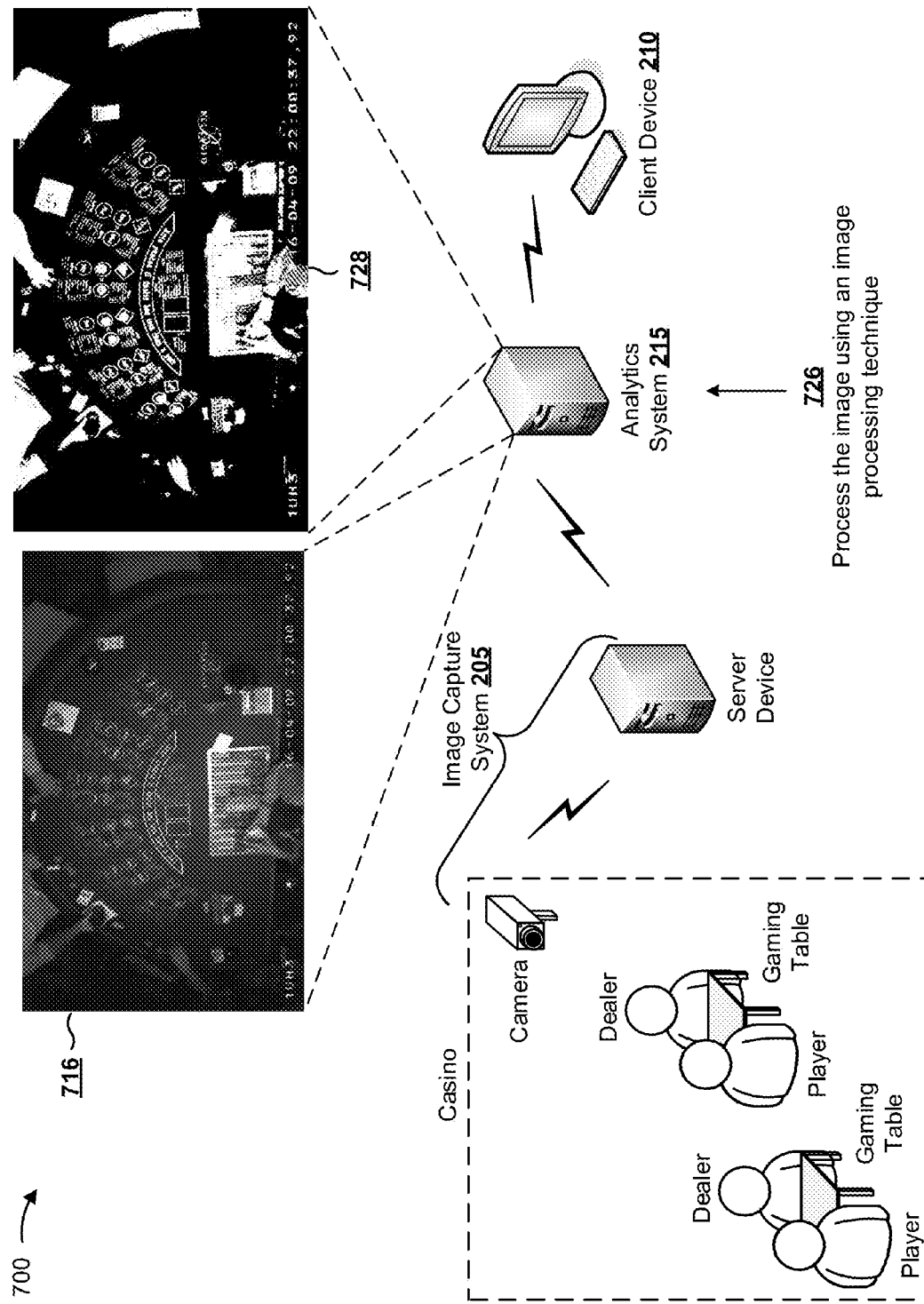
Figure 7G:
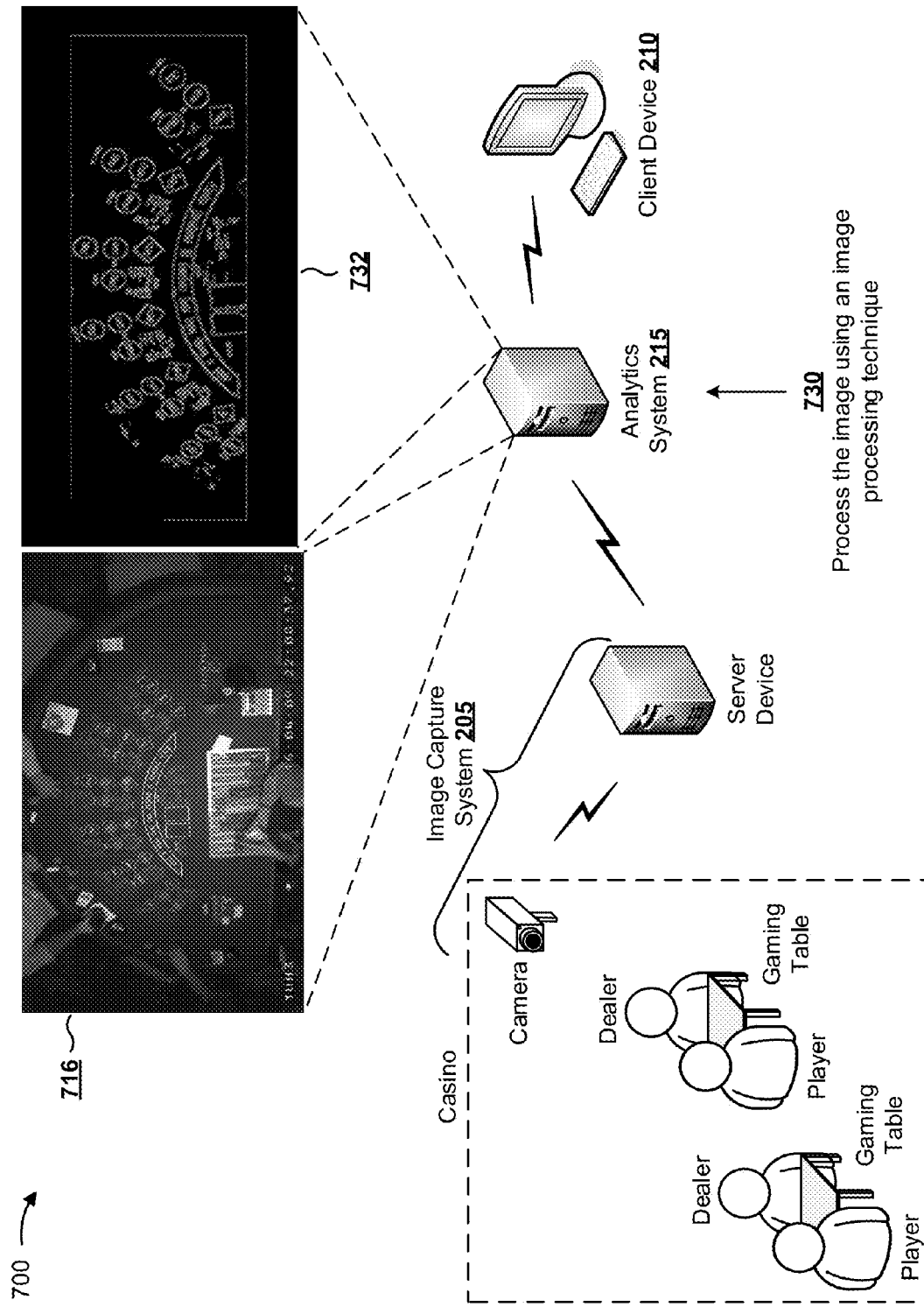
Figure 7H:
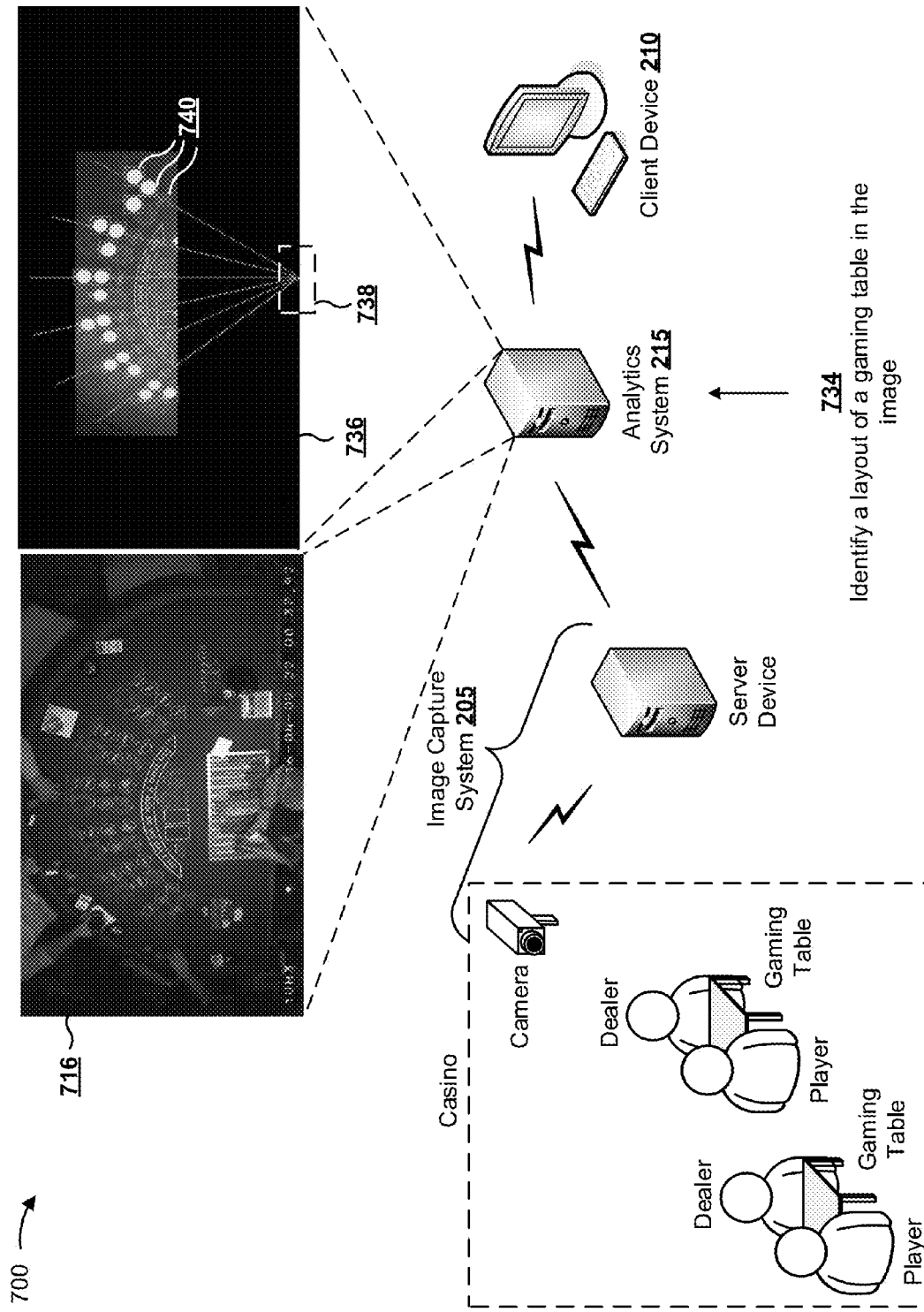
Figure 7I:
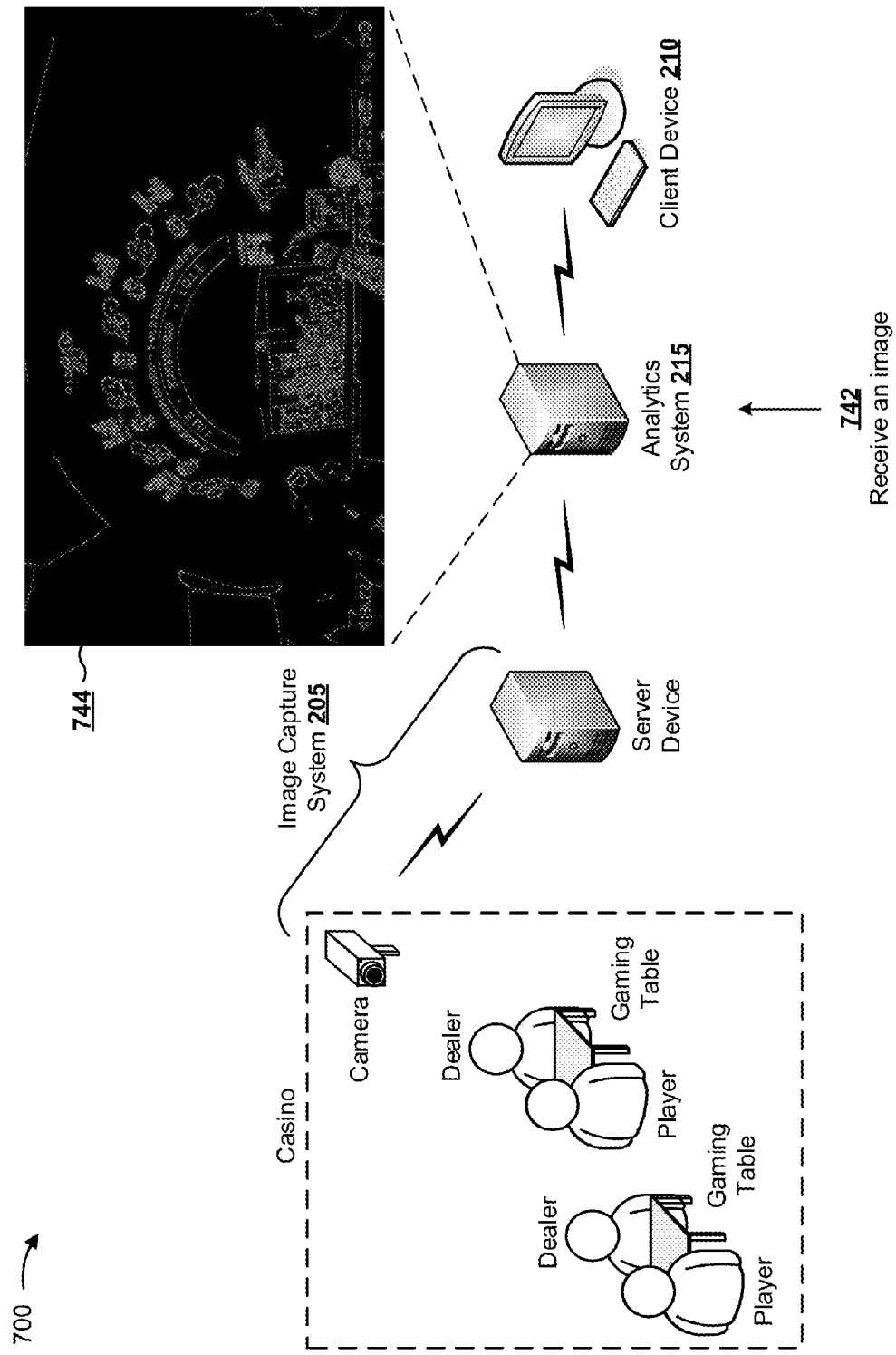
Figure 7J:
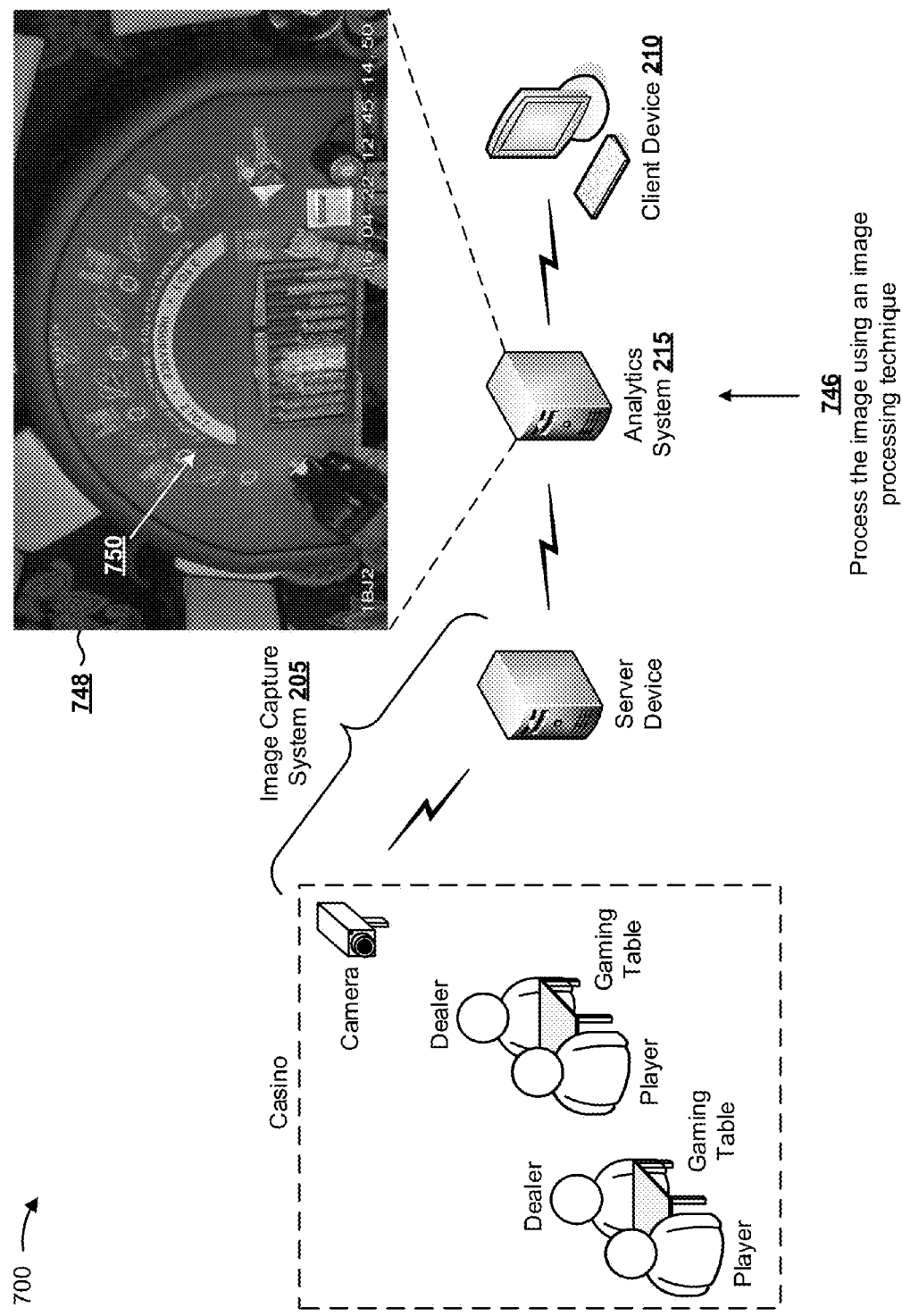
Figure 7K:
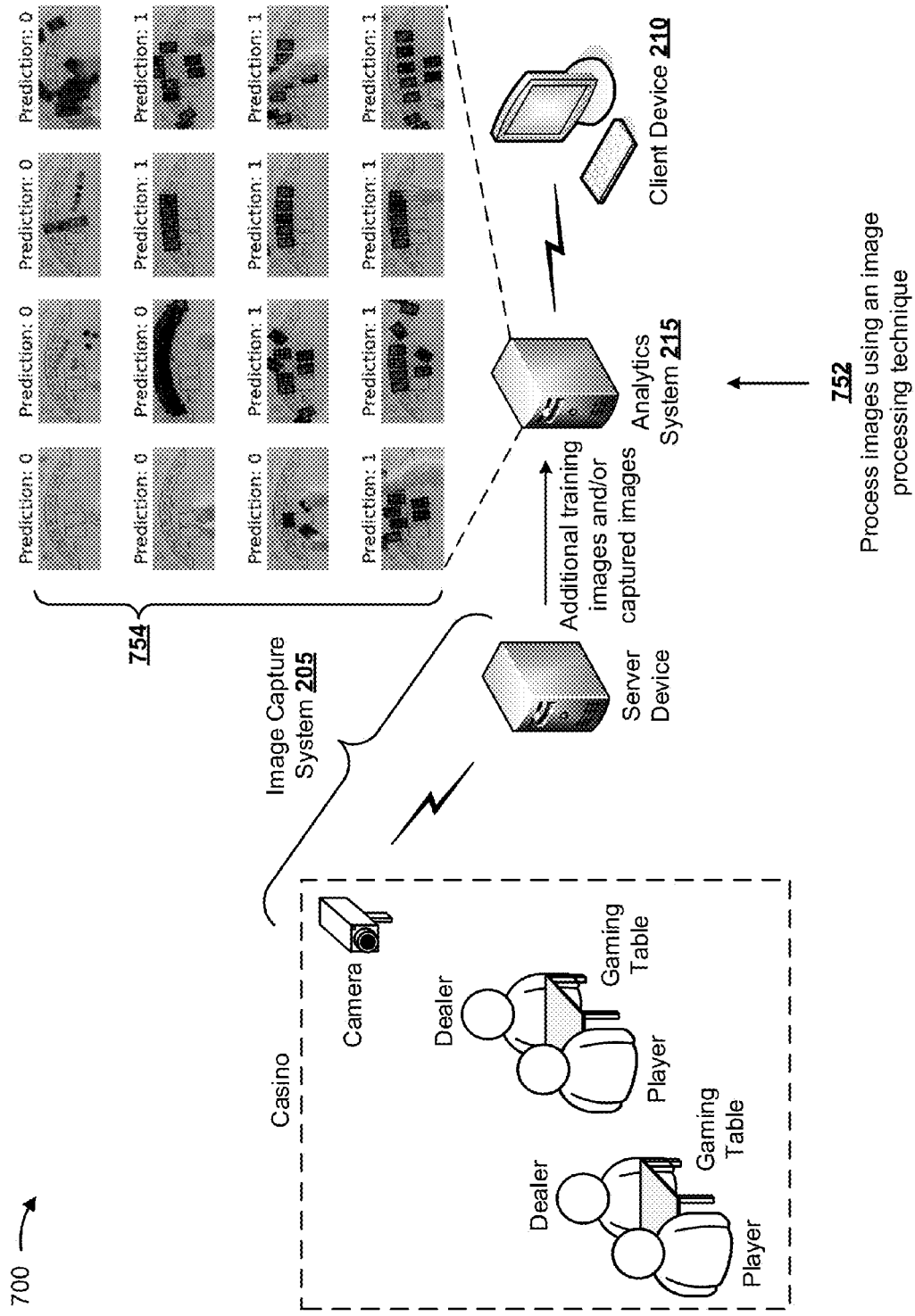
Figure 7L:
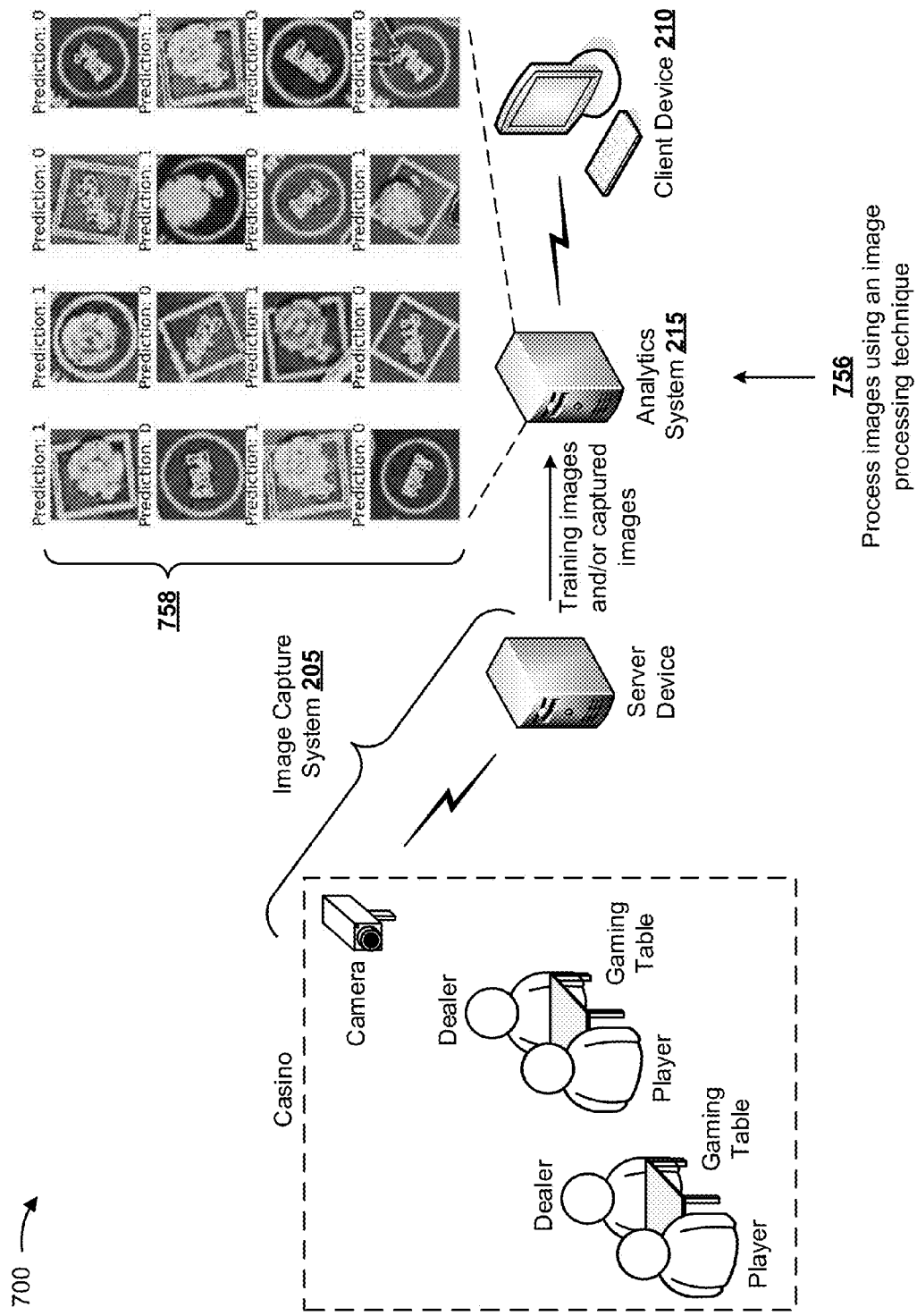
Figure 7M:
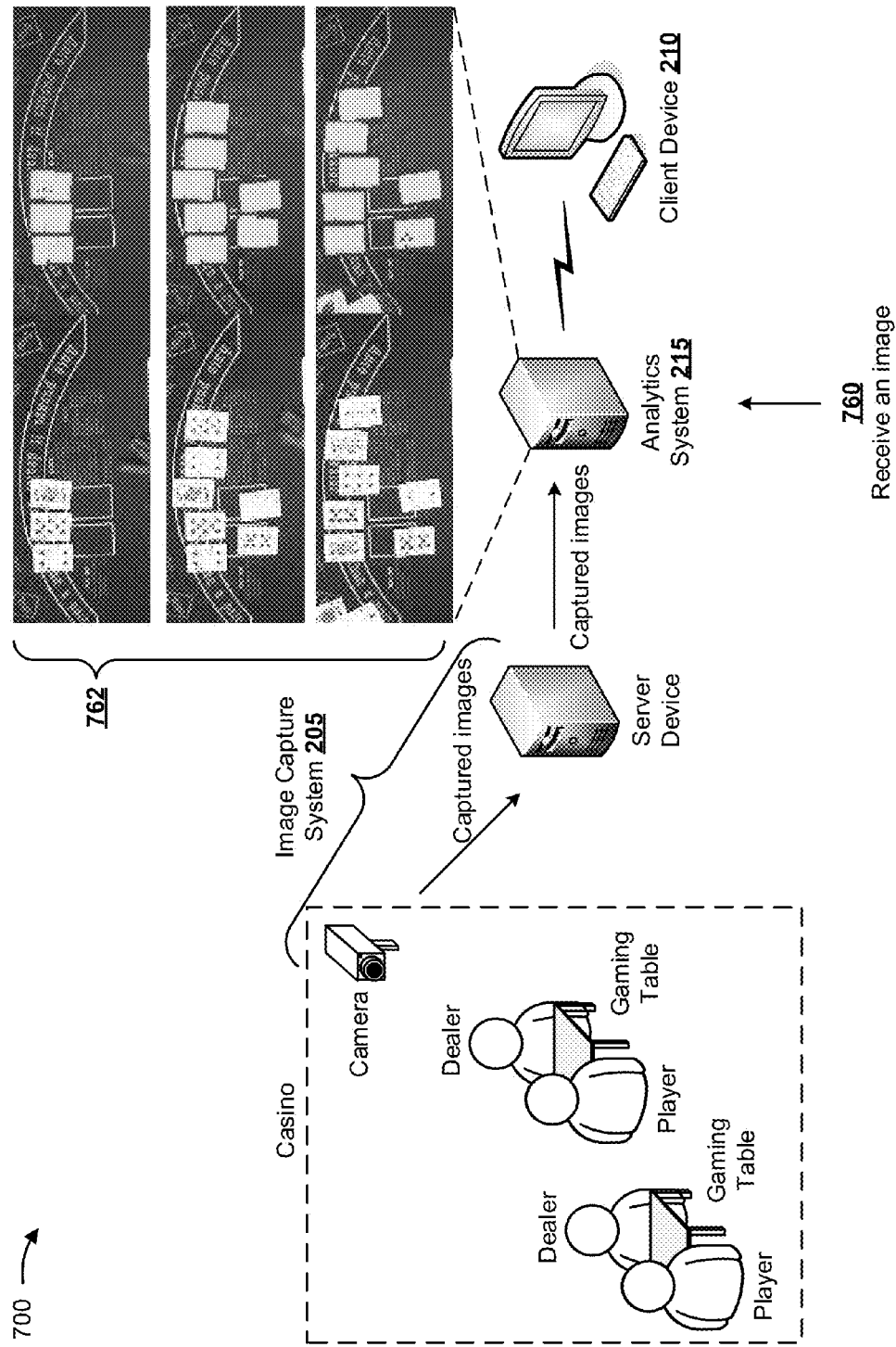
Figure 7N:
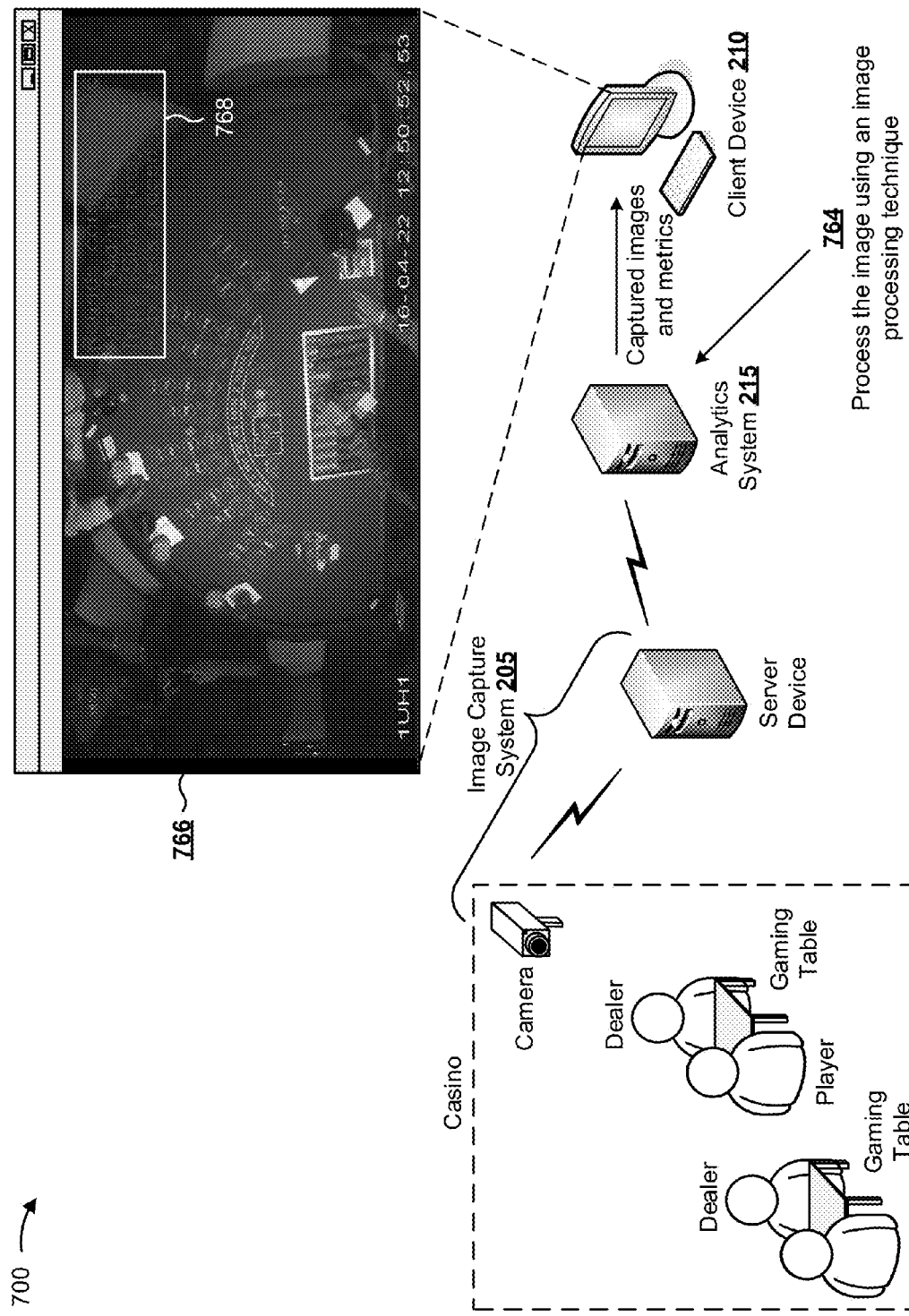

FIGS. 7A-7N are diagrams of an example implementation 700 relating to example process 400 shown by FIG. 4 and process 500 shown by FIG. 5. For example, FIGS. 7A-7N show an example of an example process for process 400 and process 500 as applied to a gaming context.

Example implementation 700 shows a gaming context including image capture system 205, analytics system 215, and client device 210. Image capture system 205 includes a camera and a server device. Example implementation 600 includes dealers, players, and gaming tables in a casino.

As shown by FIG. 7A, and by reference number 702, the server device included in image capture system 205 may provide training images to analytics system 215. For example, the training images may include images of betting slots for the same type(s) of gaming tables in the casino (e.g., images of betting slots with betting chips and/or images of betting slots without betting chips). As shown reference by number 704, analytics system 215 may receive the training images and process the training images using a convolutional neural network (CNN) model. When using the CNN model, analytics system 215 may automatically learn to detect edges from raw pixels in the training images and then use the edges to detect shapes in the training images and/or other images. In this way, the CNN model may identify betting slots that have a probability of having chips placed within the betting slots and betting slots that have a probability of not having chips placed within the betting slots.

As shown in FIG. 7B, and by reference number 706, analytics system 215 may determine a probability that an image in the training images shows a chip in a betting slot and determine whether the probability satisfies a threshold probability. For example, analytics system 215 has determined that a probability that images 708 and 710 show betting slots that include playing chips satisfies a threshold, and that a probability that image 712 shows a betting slot that includes a playing chip does not satisfy the threshold (e.g., shows a betting slot that does not include a playing chip).

As shown in FIG. 7C, and by reference number 714, analytics system 215 may receive additional training images and/or may receive captured images from image capture system 205. For example, analytics system 215 may receive the captured images from a camera, via the server device, and/or may receive the additional training images from the server device. As shown by reference number 716, analytics system 215 may receive an image (e.g., a training image and/or an image from the camera, such as an RGB color space image) showing a gaming table with varied lighting conditions (e.g., where a center portion of the image is receiving more lighting relative to outer/edge portions of the image).

As shown by FIG. 7D, and by reference number 718, analytics system 215 may process the image shown by reference number 716 using an image contrasting technique and/or a local adaptive histogram equalization technique. Based on processing the image shown by reference number 716 using the image contrasting technique and/or the local adaptive histogram equalization technique, analytics system 215 may generate the image shown by reference number 720. For example, the image contrasting technique and/or the local adaptive histogram equalization technique may modify lighting conditions of an image by increasing lighting of the image, as shown by comparing the images shown by reference numbers 716 and 720.

As shown in FIG. 7E, and by reference number 722, analytics system 215 may process the image shown by reference number 716 using a hue, saturation, value (HSV) color transformation. Based on processing the training image shown by reference number 716 using the HSV color transformation, analytics system 215 may generate the image shown by reference number 724. For example, the HSV color transformation may modify color components of the original image, shown by reference number 716, to what is shown by reference number 724. This modification may separate colors of objects shown in the image from colors of other objects, thereby improving object detection by enabling analytics system 215 to easily detect objects in the image.

As shown in FIG. 7F, and by reference number 726, analytics system 215 may process the image shown by reference number 716 using a de-noising technique. The de-noising technique may include a Gaussian smoothing and/or filtering technique and/or an image thresholding technique. Based on processing the image shown by reference number 716 using the de-noising technique, analytics system 215 may generate a local adaptive image shown by reference number 728. For example, the de-noising technique may modify the original image, shown by reference number 716, so that pixels of the original image are converted to either black or white pixels, thereby improving object detection.

As shown in FIG. 7G, and by reference number 730, analytics system 215 may process the image shown by reference number 716 using an edge and gradient technique to identify the layout of the gaming table shown in the image. Based on processing the image shown by reference number 716 using the edge and gradient technique, and as shown by reference number 732, analytics system 215 may identify different types of betting slots, such as trips betting slots, shown by diamonds on the gaming table in the image, and play betting slots, shown by circles on the gaming table in the image. Based on identifying the trips betting slots and play betting slots, analytics system 215 may identify the image as showing a Texas hold'em gaming table layout.

As shown in FIG. 7H, and by reference number 734, analytics system 215 may process the image shown by reference number 716 to identify the layout of the gaming table shown in the image. As shown by reference number 736, for example, analytics system 215 may use (e.g., or derive) an angle of projection, as shown by reference number 738, and distances of objects, shown by reference number 740, to differentiate main betting slots on a Texas hold'em gaming table from ante and/or blind betting slots on the Texas hold'em table. This differentiation may be used to identify the gaming table in the image that is shown by reference number 736 as a Texas hold'em gaming table and/or to identify an area of interest for identifying objects in later received images.

As shown in FIG. 7I, and by reference number 742, analytics system 215 may receive an image (e.g., a captured image and/or a training image) of another gaming table and identify the layout using an edge and threshold/gradient technique. Based on using the edge and threshold/gradient technique, analytics system 215 may identify a first portion of the gaming table, in the image, that is associated with a dealer and a second portion of the gaming table, in the image, that is associated with a player of the game. Based on identifying the first portion and the second portion, analytics system 215 may identify a gaming table in the image shown by reference number 744 as a Black Jack gaming table.

As shown in FIG. 7J, and by reference number 746, analytics system 215 may process the image of the other gaming table using foreground extraction and background subtraction techniques to identify a region of interest of the image of the other gaming table (e.g., based on refining contours, shape descriptors and/or morphology for a particular type of gaming table). For example, analytics system 215 may process the image shown by reference number 748 to identify an area of interest. Analytics system 215 may identify the area of interest shown by reference number 750 (e.g., a portion of a gaming table shown in the image that is associated with a playing card dealer, a portion where playing cards are placed, etc.).

As shown by FIG. 7K, image capture system 205 may provide additional images (e.g., training images and/or captured images) to analytics system 215. Image capture system 205 may provide the additional images using the server device. As further shown by FIG. 7K, and by reference number 752, analytics system 215 may process the additional images using a grayscale modeling technique to differentiate cards in play from cards not in play, cash and/or coins on the gaming table, or the like, as shown in the images. For example, and as shown by reference number 754, analytics system 215 may use a grayscale modeling technique with adaptive contrast for lighting variations to process the training images.

As further shown by reference number 754, analytics system 215 may predict whether the images show cards in play (e.g., where "0" is associated with a prediction that playing cards are not in play and "1" is associated with a prediction that playing cards are in play). Analytics system 215 may predict whether playing cards are in play using pattern recognition (e.g., to recognize markings on playing cards shown in the image), detecting an object in a particular area of interest of the image (e.g., detecting cards in an in-play area of a gaming table shown in the image), etc.

As shown in FIG. 7L, image capture system 205 may provide additional images (e.g., training images and/or captured images) to analytics system 215. For example, image capture system 205 may provide the additional images using the server device. As further shown in FIG. 7L, and by reference number 756, analytics system 215 may process the images to identify betting chips, empty and/or filled betting slots, and/or different types of bets on the gaming table, such as main bets, side bets, or play bets (e.g., to improve machine learning by analytics system 215 or to improve machine learning classifiers).

For example, and as shown by reference number 758, analytics system 215 may use computer vision generated training images to differentiate betting scenarios and to make a prediction about whether a betting slot includes a betting chip (e.g., where "0" indicates a prediction that a betting slot does not include a betting chip and "1" indicates a prediction that a betting slot includes a betting chip). In addition, and as another example, analytics system 215 may use a binary output modeling technique to differentiate playing cards from betting chips.

As shown in FIG. 7M, and by reference number 760, analytics system 215 may receive captured images from image capture system 205 and process the captured images. For example, and as shown by reference number 762, analytics system 215 may process the captured images to identify and track community playing cards of a dealer to detect a start of a Texas hold'em game. As another example, analytics system 215 may identify and track hole playing cards (e.g., playing cards dealt to a dealer) of a dealer to detect an end of the Texas hold'em game. This conserves processing resources of analytics system 215 by enabling analytics system 215 to selectively process images associated with game play (e.g., rather than processing all images received from image capture system 205).

As shown in FIG. 7N, and by reference number 764, analytics system 215 may update metrics based on processing the captured images and may provide, for display via client device 210, captured images, and/or information identifying the metrics. For example, analytics system 215 may update a quantity of rounds (e.g., betting rounds) of game play of a Texas hold'em game completed, a quantity of games played (e.g., full games), a quantity of antes and/or main bets made during a Texas hold'em game, a quantity of trips and/or side bets made during a Texas hold'em game, a quantity of play bets placed during a Texas hold'em game, or the like. As shown by reference number 766, client device 210 may display the captured image (e.g., via a display of client device 210).

As shown by reference number 768, the captured image display may include metrics associated with the objects identified in the image. In some implementations, analytics system 215 may use processed captured images, information associated with the processed captured images, and/or information associated with the metrics to create a training set for different betting scenarios across different games and/or gaming tables (e.g., for machine learning).

As indicated above, FIGS. 7A-7N are provided merely as an example. Other examples are possible and may differ from what was described with regard to FIGS. 7A-7N.

Implementations described herein enable an analytics system to automatically receive and analyze images using one or more processing techniques. In addition, analytics system 215 may automatically extract a feature and/or identify an object shown in the image based on a context of the image. Having an analytics system automatically extract a feature and/or identify an object shown in the image based on a context of the image may improve an efficiency of analyzing the image to track metrics by reducing or eliminating analysis related to contexts different from the context of the image. Additionally, an efficiency may be improved by reducing an amount of time needed to analyze the image to track the metrics. Further, an efficiency of performing an action based on the metrics, changes in the metrics, or the like, may be improved by enabling analysis of an image in real-time or near real-time.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive a set of images to be processed,
an image, of the set of images, depicting multiple objects,
a first object of the multiple objects being different than a second object of the multiple objects;
process the image;
identify the first object or the second object based on processing the image;
identify a context of the image based on identifying the first object and based on metadata of the image;
reprocess the image based on identifying the context;
identify a third object based on reprocessing the image;
identify a metric associated with the context;
determine that the third object contributes to a value of the metric;
update the value of the metric based on determining that the third object contributes to the value of the metric; and
perform an action based on the value of the metric or based on identifying the third object.

2. The device of claim 1, where the one or more processors are further to:
identify a fourth object depicted in the image; and
where the one or more processors, when identifying the context of the image, are to:
identify the context of the image based on identifying the fourth object depicted in the image.

3. The device of claim 1, where the one or more processors are further to:
prevent the device from identifying a fourth object,
the fourth object being associated with a different context.

4. The device of claim 1, where the one or more processors are further to:
receive multiple sets of images to be processed,
a first set of images, of the multiple sets of images, and a second set of images, of the multiple sets of images, being associated with a first location;
determine whether a fourth object, depicted in the first set of images, is depicted in the second set of images; and
mark or unmark the fourth object for the first set of images and the second set of images based on determining whether the fourth object is depicted in the second set of images.

5. The device of claim 1, where the multiple objects include:
betting slots,
playing chips, or
playing cards.

6. The device of claim 1, where the one or more processors, when updating the value of the metric, are to:
update a quantity of games played,
update a quantity of rounds played, or
update a quantity of bets placed.

7. The device of claim 1, where the one or more processors, when performing the action, are to:
transmit a message or a command to a dispatch system or a scheduling system based on the value of the metric or based on identifying the first object or the second object.

8. A non-transitory computer-readable medium storing instructions, the instructions comprising:
one or more instructions that, when executed by one or more processors, cause the one or more processors to:
receive, from an image capture system, one or more images captured by the image capture system,
the one or more images depicting one or more objects;
process the one or more images using one or more image processing techniques;
identify the one or more objects based on processing the one or more images;
identify a context of the one or more images based on identifying the one or more objects and based on metadata;
reprocess the one or more images based on identifying the context;
identify another object based on reprocessing the one or more images;

determine whether the other object contributes to a value of one or more metrics associated with the context; and perform an action based on the value of the one or more metrics.

9. The non-transitory computer-readable medium of claim 8, where the one or more instructions, when executed by the one or more processors, further cause the one or more processors to:

mark a first object, of the one or more objects, in a first image of the one or more images;

determine that the first object is not depicted in a second image of the one or more images; and unmark the first object in the first image based on determining that the first object is not depicted in the second image.

10. The non-transitory computer-readable medium of claim 8, where the one or more instructions, when executed by the one or more processors, further cause the one or more processors to:

extract one or more features or one or more object parameters of the one or more objects; and where the one or more instructions, that cause the one or more processors to identify the context, cause the one or more processors to:

identify the context based on the one or more features or the one or more object parameters of the one or more objects.

11. The non-transitory computer-readable medium of claim 8, where the one or more instructions, when executed by the one or more processors, further cause the one or more processors to:

identify a first context associated with a first image of the one or more images;

identify a second context associated with a second image of the one or more images; and where the one or more instructions, that cause the one or more processors to reprocess the one or more images, cause the one or more processors to:

reprocess at least one of the first image or the second image based on identifying the first context or the second context.

12. The non-transitory computer-readable medium of claim 8, where the one or more instructions, that cause the one or more processors to identify the one or more objects, cause the one or more processors to:

identify a combination of a first object, of the one or more objects, and a second object of the one or more objects; and where the one or more instructions, that cause the one or more processors to reprocess the one or more images, cause the one or more processors to:

reprocess the one or more images based on identifying the combination of the first object and the second object.

13. The non-transitory computer-readable medium of claim 8, where the one or more metrics are associated with a first context and not a second context.

14. The computer-readable medium of claim 8, where the one or more instructions, that cause the one or more processors to identify the context of the one or more images, cause the one or more processors to:

identify the context of the one or more images as a manufacturing context based on the one or more objects, the one or more objects including conveyor belts, manufacturing equipment, or hardhats.

15. A method, comprising:

receiving, by a device, a set of images to be used as a training set, the set of images depicting multiple objects;

processing, by the device, the set of images using a set of techniques based on receiving the set of images, the processing permitting the device to extract a feature or identify an object parameter of an object depicted in the set of images;

identifying, by the device, the object depicted in the set of images based on processing the set of images;

extracting, by the device, the feature of the object depicted in the set of images based on identifying the object depicted in the set of images;

identifying, by the device, the object parameter of the object depicted in the set of images based on identifying the object depicted in the set of images or extracting the feature of the object;

identifying, by the device, a context of the set of images based on the extracted feature or the object parameter and based on metadata of the set of images;

reprocessing, by the device, the set of images based on identifying the context;

identifying, by the device, another object of the multiple objects based on reprocessing the set of images;

determining, by the device, that the other object contributes to a value of a metric associated with the context; and storing, by the device, at least one of:

the value of the metric, the set of images, information identifying the extracted feature, or information identifying the identified object parameter.

16. The method of claim 15, further comprising:

adjusting identification of the object parameter using another set of images; and associating the identification of the object parameter with a metric based on adjusting the identification of the object parameter.

17. The method of claim 16, further comprising:

receiving structured data or an additional set of images, the structured data being related to the set of images; and marking or unmarking an additional object or an additional object parameter based on the structured data or the additional set of images.

18. The method of claim 15, further comprising:

determining that the object or the object parameter is associated with a particular context, the particular context being a public safety context or a travel context; and where identifying the context of the set of images comprises:

identifying the context of the set of images based on determining that the object or the object parameter is associated with the particular context.

19. The method of claim 15, where processing the set of images comprises:

processing the set of images using a set of computer vision algorithms that includes:

an edge detection technique, a signal processing technique, a template matching technique, a color segmentation technique, a histogram equalization technique, or a technique that uses a contour or convex hull; and where extracting the feature of the object comprises:
  extracting the feature of the object based on processing the set of images using the set of computer vision algorithms.

20. The method of claim 15, further comprising:
receiving multiple images to be processed,
  the multiple images depicting multiple other objects,
  the multiple images being different than the set of images;
processing the multiple images using the set of techniques based on receiving the multiple images;
extracting features or object parameters from the multiple images based on processing the multiple images,
  the features or the object parameters being associated with identifying the multiple other objects;
identifying the multiple other objects included in the multiple images based on extracting the features or the object parameters;
identifying the context of the multiple images based on the multiple other objects;
determining a value of a metric associated with the multiple other objects and the context; and
performing an action based on the value of the metric or based on identifying the multiple other objects.

\* \* \* \* \*